(12) United States Patent
Okamoto et al.

(10) Patent No.: US 10,564,957 B2
(45) Date of Patent: Feb. 18, 2020

(54) ELECTRONIC MACHINE, VERSION CHECK SYSTEM AND RECORDING MEDIUM

(71) Applicant: KYOCERA Document Solutions INc., Osaka (JP)

(72) Inventors: Kentaro Okamoto, Osaka (JP); Yoshitaka Matsuki, Osaka (JP); Kazuki Dozen, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 212 days.

(21) Appl. No.: 15/691,534

(22) Filed: Aug. 30, 2017

(65) Prior Publication Data

US 2018/0060064 A1 Mar. 1, 2018

(30) Foreign Application Priority Data

Aug. 30, 2016 (JP) .................... 2016-167785
Oct. 26, 2016 (JP) .................... 2016-209836
Oct. 26, 2016 (JP) .................... 2016-209837

(51) Int. Cl.
*G06F 8/654* (2018.01)
*G06F 8/71* (2018.01)

(52) U.S. Cl.
CPC .......... *G06F 8/654* (2018.02); *G06F 8/71* (2013.01)

(58) Field of Classification Search
CPC ... G06F 8/65; G06F 8/654; G06F 8/60; G06F 8/71
(Continued)

(56) References Cited

U.S. PATENT DOCUMENTS 9,075,689 B2 * 7/2015 Kanematsu ............... G06F 8/65
2013/0145141 A1 * 6/2013 Han ........................ G06F 8/65
713/2

(Continued)

FOREIGN PATENT DOCUMENTS

JP 2004-042304 A 2/2004
JP 2009-230398 A 10/2009
(Continued)

OTHER PUBLICATIONS

Japan Patent Office. Office Action of foreign counterpart. dated Mar. 19, 2019.

*Primary Examiner* — Marina Lee
(74) *Attorney, Agent, or Firm* — Hawaii Patent Services; Nathaniel K. Fedde; Kenton N. Fedde

(57) ABSTRACT

Provided is an electronic machine that is able to update only necessary firmware. The electronic machine includes a panel unit, a storage device, a firmware-management unit, and a system-control unit. The storage device stores a plurality of firmware that is divided for each function, and that has version information to which package information is given that indicates a combination of latest versions of firmware that guarantees operation. The firmware-management unit has a latest version of a management table in which version information of the plurality of the latest versions of firmware, and package information that indicates a combination of the firmware are registered, and that is downloaded from an information-distribution server, and that based on an instruction to check versions of the firmware, checks whether or not version information of the respective firmware that is read from the storage device and version information that is registered in the management table match. The system-control unit instructs the firmware-management unit to check the versions and causes the check results of the firmware-management unit to be displayed on
(Continued)

the panel unit. Moreover, when there is an instruction via the panel unit to download the latest version of the management table, the system-control unit sends a request to the information-distribution server for downloading the latest version of the management table, and when there is an instruction via the panel unit to perform a download based on the check results of the firmware-management unit, sends a request to the information-distribution server for a download.

10 Claims, 15 Drawing Sheets

(58) Field of Classification Search
USPC .......................................... 717/168–178, 122
See application file for complete search history.

(56) References Cited

U.S. PATENT DOCUMENTS

| 2014/0013449 | A1* | 1/2014 | Vijay | G06F 21/10 |
| | | | | 726/29 |
| 2014/0047430 | A1* | 2/2014 | Kanematsu | G06F 8/65 |
| | | | | 717/170 |
| 2015/0154014 | A1* | 6/2015 | Adachi | G06F 8/65 |
| | | | | 717/169 |
| 2018/0060064 | A1* | 3/2018 | Okamoto | G06F 8/71 |

FOREIGN PATENT DOCUMENTS

| JP | 2013-250923 A | 12/2013 |
| JP | 2014-232424 A | 12/2014 |

\* cited by examiner

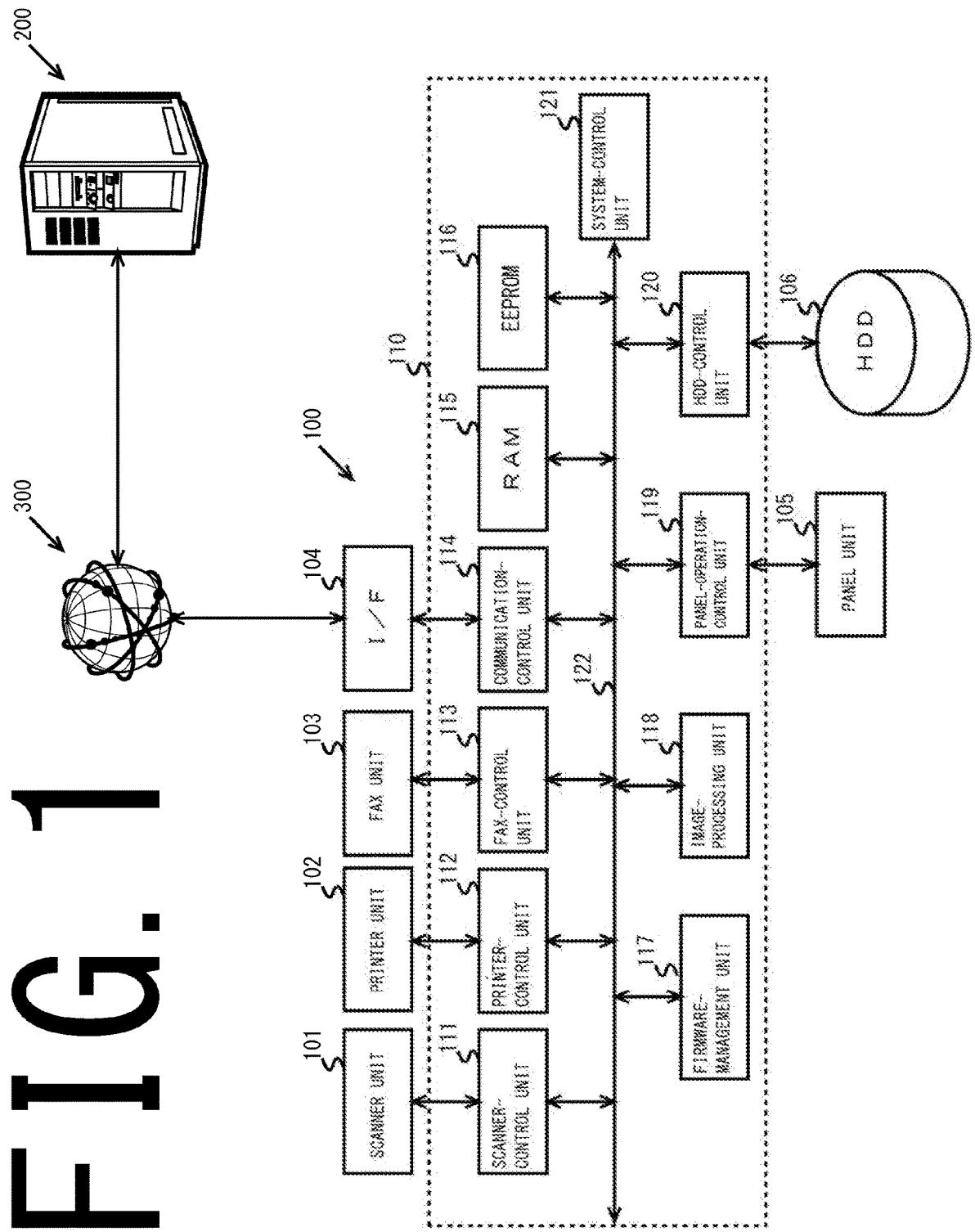

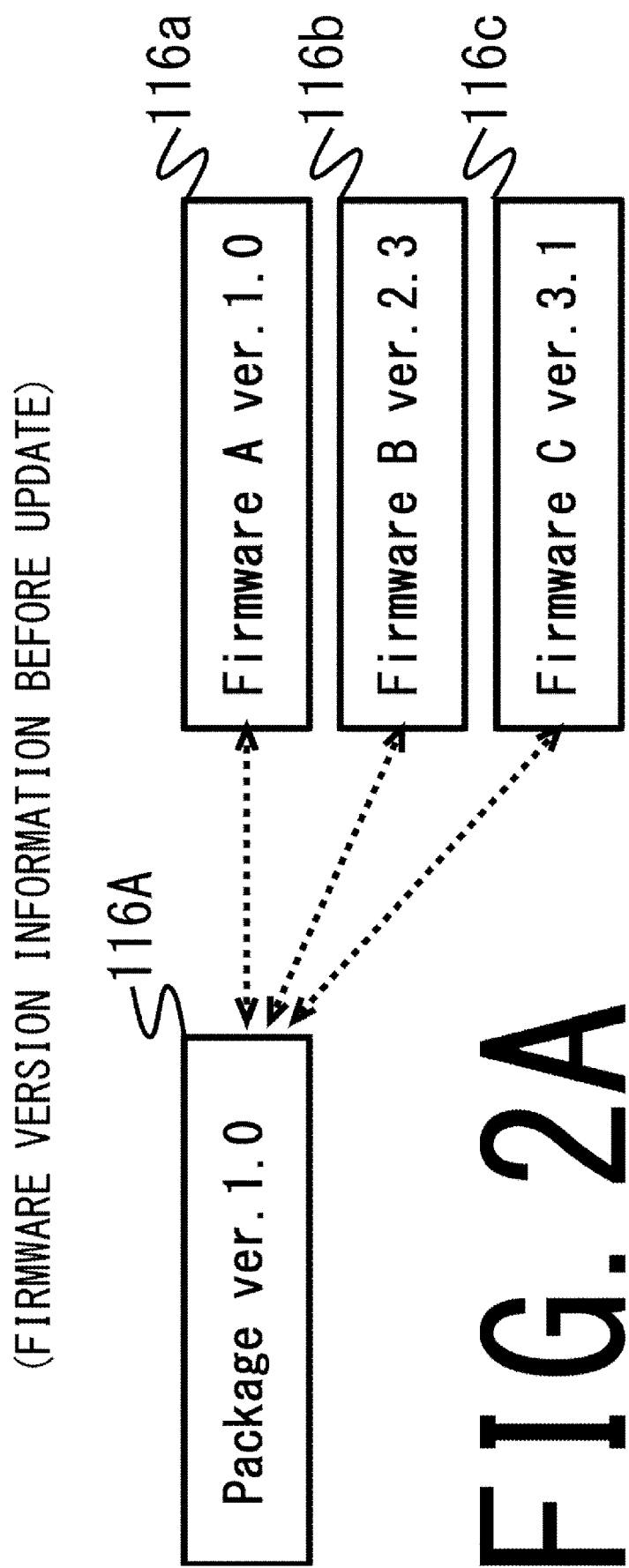
FIG. 2A (FIRMWARE VERSION INFORMATION BEFORE UPDATE)

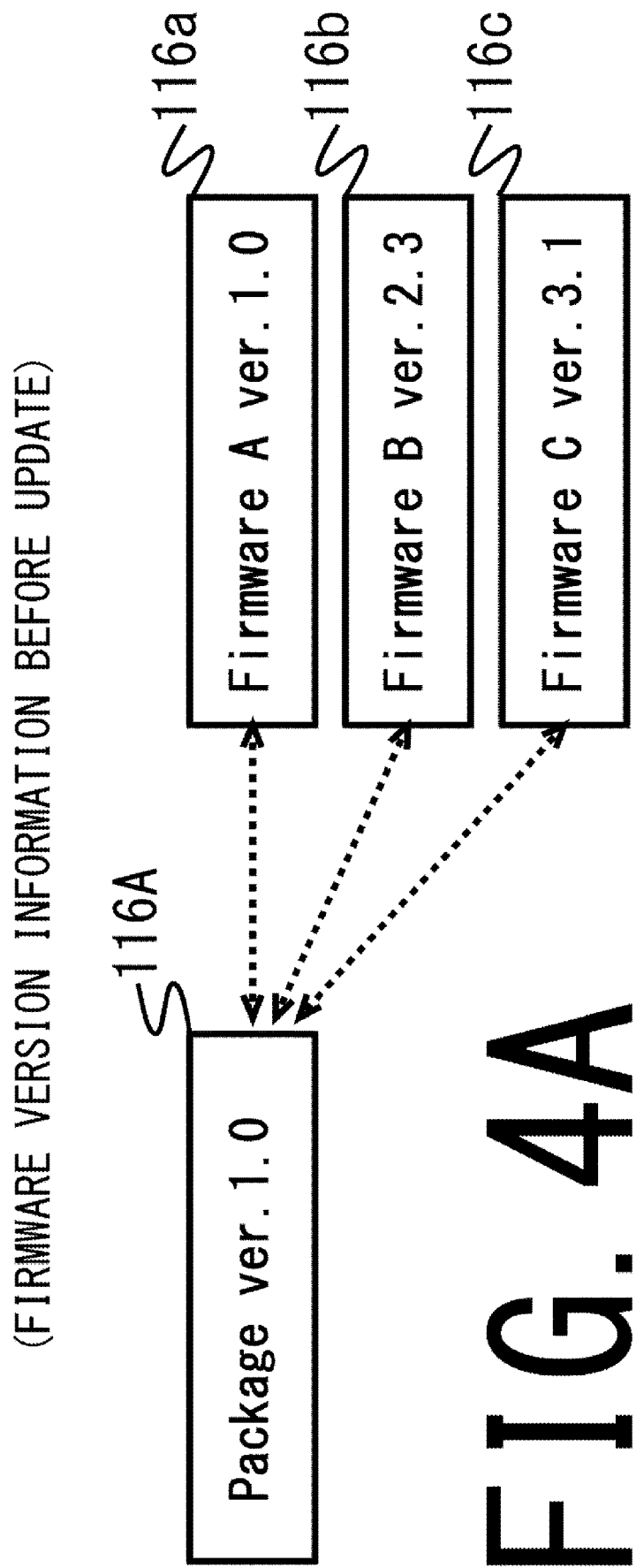
FIG. 4A (FIRMWARE VERSION INFORMATION BEFORE UPDATE)

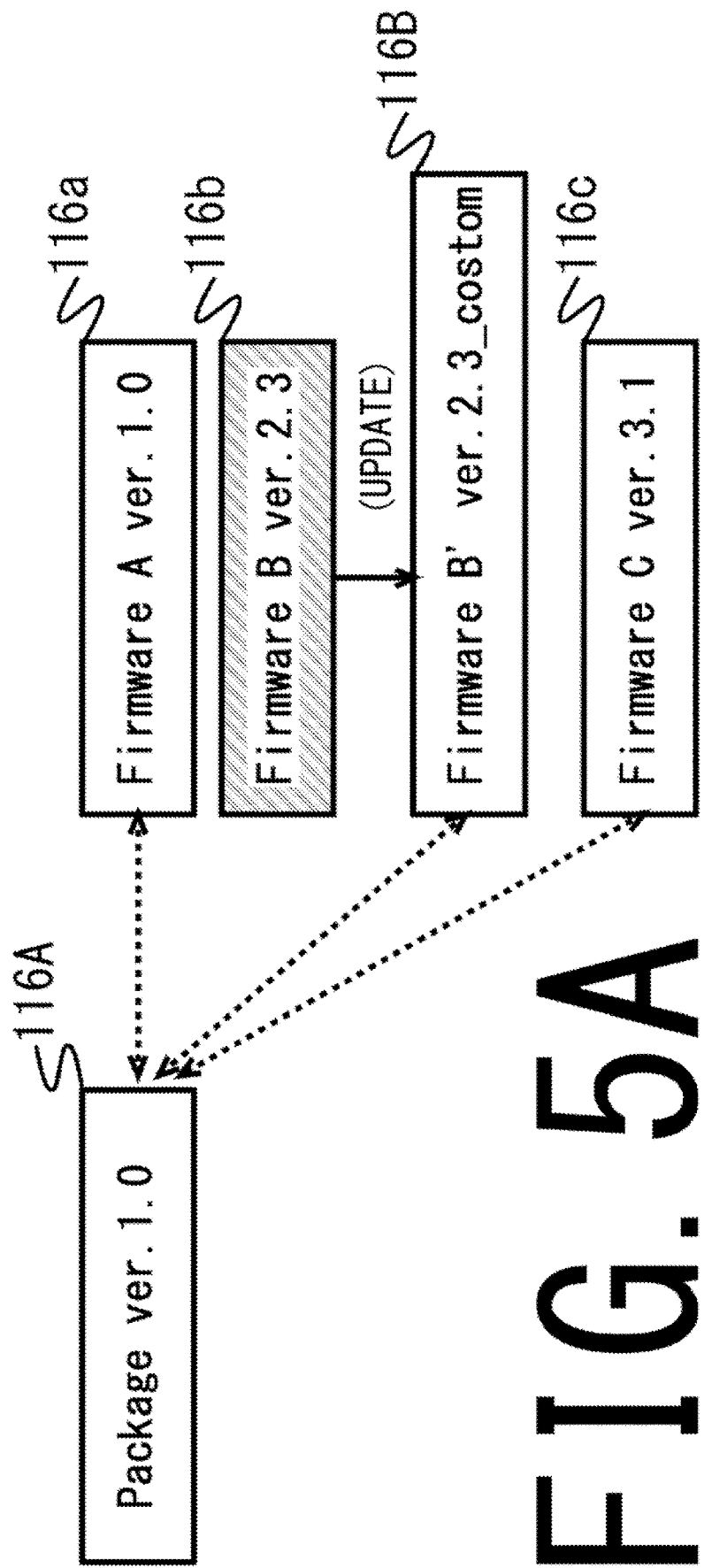

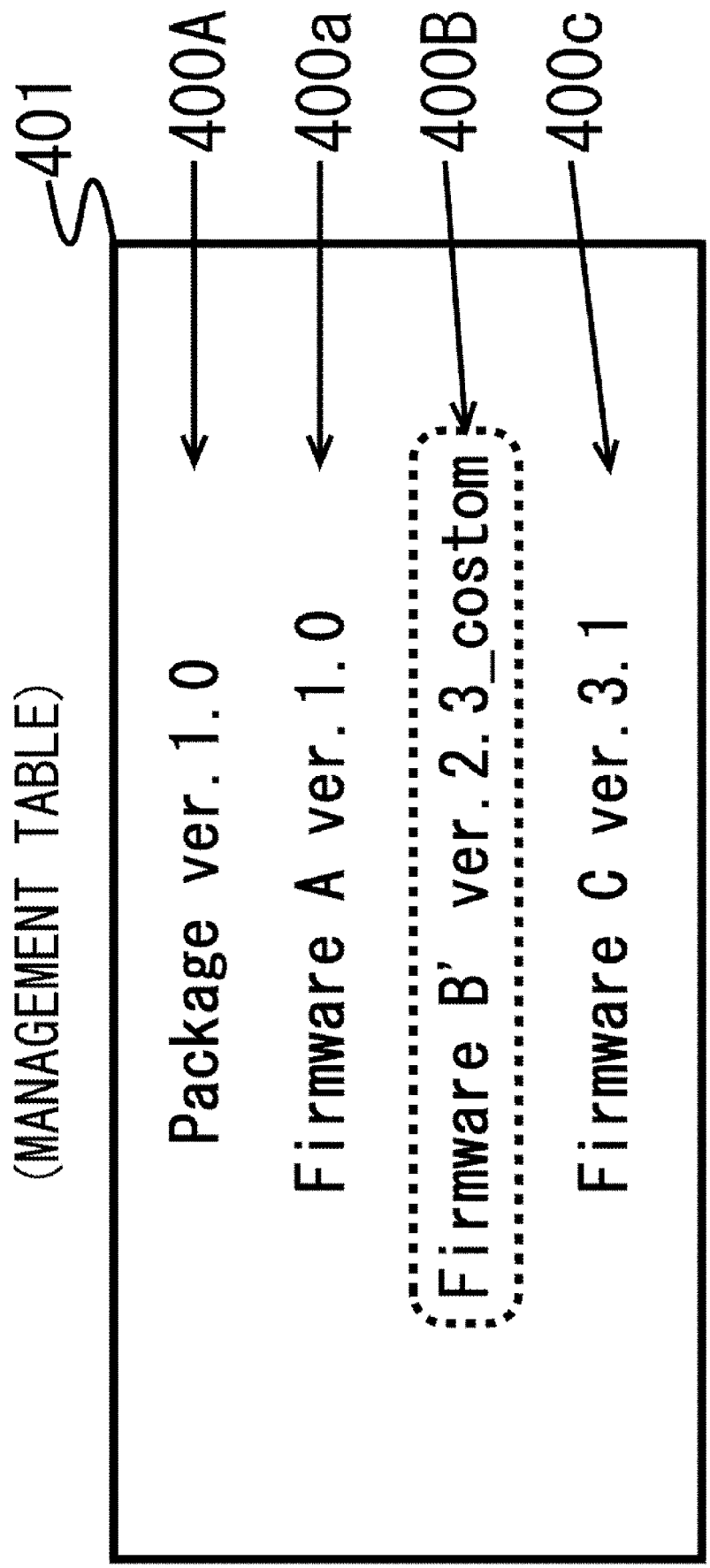

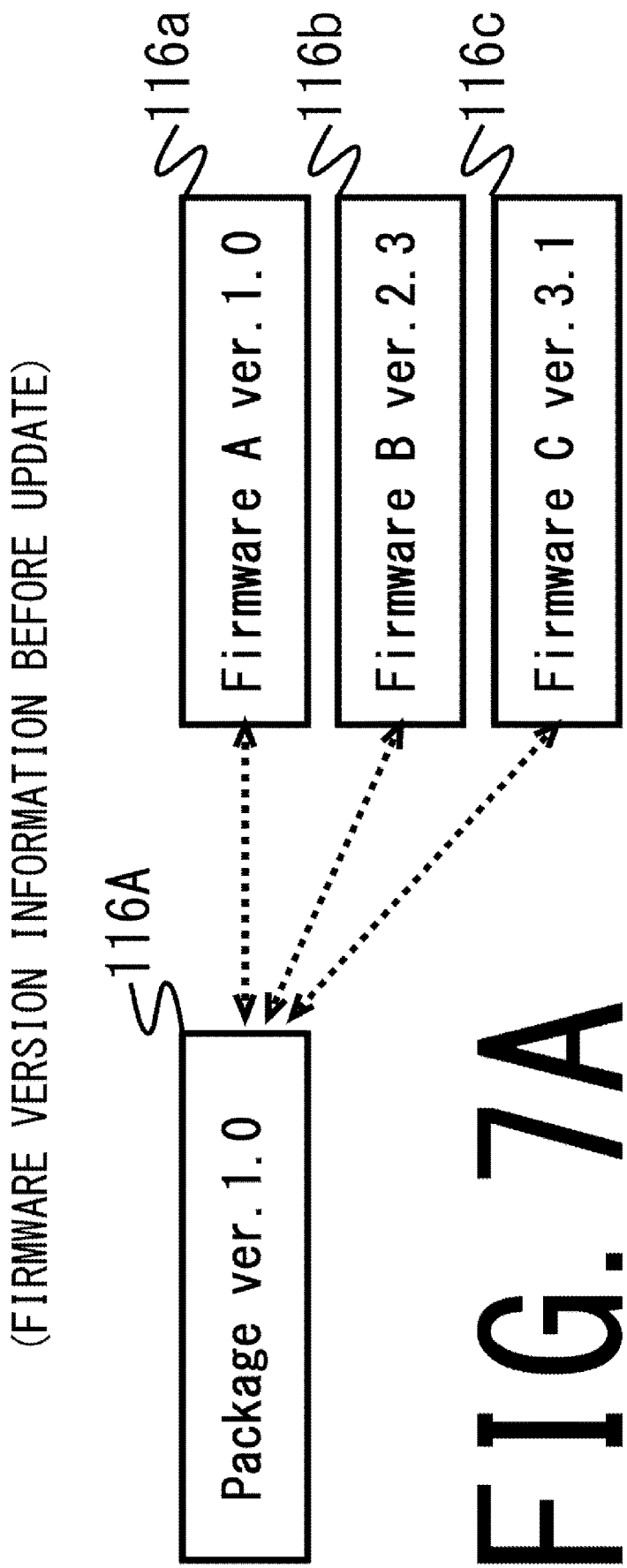
FIG. 7A (FIRMWARE VERSION INFORMATION BEFORE UPDATE)

ELECTRONIC MACHINE, VERSION CHECK SYSTEM AND RECORDING MEDIUM

INCORPORATION BY REFERENCE

This application is based on and claims the benefit of priority from Japanese Patent Application No. 2016-167785 filed on Aug. 30, 2016, No. 2016-209836 filed on Oct. 26, 2016 and No. 2016-209837 filed on Oct. 26, 2016, the entire contents of which are hereby incorporated by reference.

BACKGROUND

The present disclosure relates to an electronic device, a version check system and a recording medium that are suitable for firmware version management.

For example, in an image-forming apparatus that is a MFP (Multifunction Peripheral) such as a multifunction printer, combination machine or the like, there are models that are equipped with a printing function, a copying function, a FAX function, a data transmitting and receiving function via a network and the like. These functions are executed based on respective dedicated software, however, it is expected that functions will continue to increase in the future.

In order to ensure operation, preferably the firmware for causing the hardware to operate according to each respective function is the latest version. Therefore, the firmware is updated as necessary, however, in order to improve the processing speed for updating, the firmware, for example, may be divided for each function. In other words, the respective firmware that is divided for each function can be updated individually. Moreover, each respective firmware has version information that includes a unique function name and version number, so it is possible to determine whether the firmware is the most recent by checking the respective version information.

In regard to the updating of firmware, in a typical example the software update support program on the management server side determines whether or not the combination of the version information of each respective software that is installed on the PC (Personal Computer) side is a combination of version information that is guaranteed in a guaranteed version combination table. Moreover, a software-update support apparatus is proposed that, when the combination is not a combination of guaranteed version information, causes the necessary software to be downloaded in order that the combination becomes of combination of version information for which operation is guaranteed.

SUMMARY

The electronic machine according to the present disclosure includes a panel unit, a storage device, a firmware-management unit, and a system-control unit. The storage device stores a plurality of firmware that is divided for each function, and that has version information to which package information is given that indicates a combination of latest versions of firmware that guarantees operation. The firmware-management unit has a latest version of a management table in which version information of the plurality of the latest versions of firmware and package information that indicates a combination of the firmware are registered, and that is downloaded from an information-distribution server, and that based on an instruction to check versions of the firmware, checks whether or not version information of the respective firmware that is read from the storage device and version information that is registered in the management table match. The system-control unit instructs the firmware-management unit to check the versions and causes the check results of the firmware-management unit to be displayed on the panel unit. Moreover, when there is an instruction via the panel unit to download the latest version of the management table, the system-control unit sends a request to the information-distribution server for downloading the latest version of the management table, and when there is an instruction via the panel unit to perform a download based on the check results of the firmware-management unit, sends a request to the information-distribution server for a download.

The version check system according to the present disclosure includes an electronic machine and a management apparatus that is capable of communicating with the electronic machine. The management apparatus has a panel unit. The electronic machine includes a storage device, a firmware-management unit, and a system-control unit. The storage device stores a plurality of firmware that is divided for each function, and that has version information to which package information is given that indicates a combination of latest versions of firmware that guarantees operation. The firmware-management unit has a latest version of a management table in which version information of the plurality of the latest versions of firmware and package information that indicates a combination of the firmware are registered, and that is downloaded from an information-distribution server, and that based on an instruction to check versions of the firmware, checks whether or not version information of the respective firmware that is read from the storage device and version information that is registered in the management table match. The system-control unit instructs the firmware-management unit to check the versions and causes the check results of the firmware-management unit to be displayed on the panel unit. Moreover, when there is an instruction via the panel unit to download the latest version of the management table, the system-control unit sends a request to the information-distribution server for downloading the latest version of the management table, and when there is an instruction via the panel unit to perform a download based on the check results of the firmware-management unit, sends a request to the information-distribution server for a download.

The non-transitory computer-readable recording medium according to the present disclosure stores a control program that is executable by a computer. The control program causes the computer, by a storage device, to store a plurality of firmware that is divided for each function, and that has version information to which package information is given that indicates a combination of latest versions of firmware that guarantees operation. The firmware-management unit has a latest version of a management table in which version information of the plurality of the latest versions of firmware and package information that indicates a combination of the firmware are registered, and that is downloaded from an information-distribution server. The control program causes the computer, by a firmware-management unit, based on an instruction to check versions of the firmware, to check whether or not version information of the respective firmware that is read from the storage device and version information that is registered in the management table match. The control program causes the computer, by a system-control unit, to instruct the firmware-management unit to check the versions and cause the check results of the firmware-management unit to be displayed on the panel unit; and when there is a an instruction via the panel unit to download the latest version of the management table, to send a request to the information-distribution server for downloading the latest version of the management table, and when there is an instruction via the panel unit to perform a download based on the check results of the firmware-management unit, to send a request to the information-distribution server for a download.

BRIEF DESCRIPTION OF THE DRAWINGS

FIG. 1 illustrates an embodiment for a case in which an electronic machine according to the present disclosure is applied to a MFP.

FIG. 2A to FIG. 2C are diagrams explaining firmware and the like that is installed in the MFP in FIG. 1 in a first embodiment according to the present disclosure, wherein FIG. 2A illustrates version information and the like of firmware before updating that is stored in the EEPROM in FIG. 1; FIG. 2B illustrates version information of firmware after updating that is stored in the EEPROM in FIG. 1; and FIG. 2C illustrates a management table that indicates the combination of the latest versions of firmware that guarantees operation of the firmware.

FIGS. 4A and 4B are diagrams for explaining firmware and the like that is installed in the MFP in FIG. 1 in a second embodiment according to the present disclosure, wherein FIG. 4A illustrates version information of firmware before updating that is stored in the EEPROM in FIG. 1; and FIG. 4B illustrates a management table that illustrates a combination of the latest versions of firmware that guarantees the operation of the firmware.

FIGS. 5A and 5B are diagrams explaining updating of firmware that is installed in the MFP in FIG. 1, wherein FIG. 5A illustrates version information and the like for the case in which arbitrary firmware is updated to a custom version of firmware; and FIG. 5B illustrates a management table that is generated by the firmware-management unit in FIG. 1 when arbitrary firmware is updated to a custom version.

FIGS. 7A and 7B are diagrams explaining firmware and the like that is installed in the MFP in FIG. 1 in a third embodiment according to the present disclosure, wherein FIG. 7A illustrates version information and the like of firmware before updating that is stored in the EEPROM in FIG. 1; and FIG. 7B illustrates a management table that indicates the combination of the latest versions of firmware that guarantees operation of the firmware.

FIGS. 8A and 8B are diagrams explaining updating of firmware and the like that is installed in the MFP in FIG. 1, wherein FIG. 8A illustrates version information and the like of firmware for the case in which arbitrary firmware is updated to an evaluation version of firmware; and FIG. 8B illustrates a management table that is generated by the firmware-management unit in FIG. 1 when arbitrary firmware is updated to an evaluation version of firmware.

DETAILED DESCRIPTION

Figure 2B:
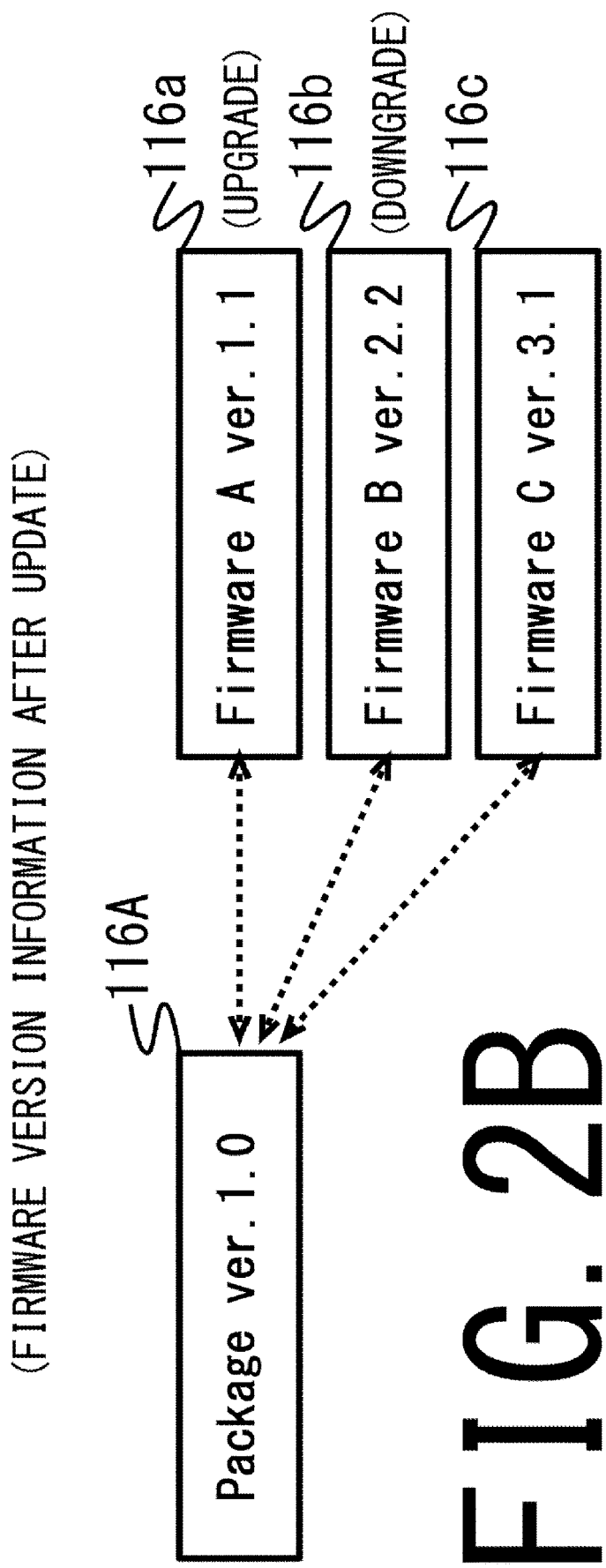

In the following, a first embodiment of an electronic machine according to the present disclosure will be explained while referencing FIG. 1 to FIG. 3. As an example of an electronic machine in the following explanation is a MFP that is a combined peripheral machine that is equipped, for example, with a printing function, a copying function, a FAX function, a data transmitting and receiving function via network and the like.

First, as illustrated in FIG. 1, the MFP 100 is connected to an information-distribution server 200 that distributes information such as firmware and the like via a network 300 such as the Internet and the like. Moreover, the MFP 100 downloads a management table 400 (described later) and the latest versions of firmware and the like that corresponds to the various functions from the information-distribution server 200. The management table 400 manages the combination of the latest versions of firmware that guarantees operation using package information 116A (described later). Moreover, the management table 400 and the latest versions of firmware that correspond to various functions may be obtained from a storage device such as a USB memory and the like.

Here, the MFP 100 includes a control unit 110 that controls the operation of a scanner unit 101, a printer unit 102, a FAX unit 103, an I/F 104, a panel unit 105 and a HDD 106.

The scanner unit 101 is a device that converts images of a document that is read by an image sensor to digital image data, and inputs that digital image data to the control unit 110. The printing unit 102 is a device that prints images on paper based on printing data that is outputted from the control unit 110. The FAX unit 103 is a device that transmits data that is outputted from the control unit 110 to a facsimile of another party, and that receives data from the facsimile of another party and inputs that data to the control unit 110.

The I/F 104 is connected to the information-distribution server 200 via the network 300. The I/F 104 may take charge of communication with other MFPs, user terminals and the like, and may take charge of communication with a contents server, web server and the like. The panel unit 105 is a device such as a touch panel that performs a display for the printing function, the copying function, the FAX function, the data transmitting and receiving function via a network, and various settings of the MFP 100. The HDD 106 is a storage device that stores application programs and the like for providing the various functions of the MFP 100. Moreover, the HDD 106 has, for example, user boxes for storing printing jobs that are registered from a user terminal and data that corresponds to printing in page description language.

The control unit 110 is a processor that controls the overall operation of the MFP 100 by executing application programs such as a verification program and the like, an image-forming program, and a control program and the like. The control unit 110 includes a scanner-control unit 111, a printer-control unit 112, a FAX-control unit 113, a communication-control unit 114, a RAM 115 an EEPROM 116, a firmware-management unit 117, an image-processing unit 118, a panel-operation-control unit 119, a HDD-control unit 120 and a system-control unit 121. Moreover, these units are connected to a data bus 122.

The scanner-control unit 111 controls the reading operation of the scanner unit 101. The printer-control unit 112 controls the printing operation of the printer unit 102. The FAX-control unit 113 controls the data transmitting and receiving operation by the FAX unit 103. The communication-control unit 114, via the I/F 104, performs control of transmitting or receiving data and the like via the network 300.

The RAM 115 is a work memory for executing programs. Moreover, the RAM 115 stores printing data that has undergone image processing by the image-processing unit 118.

The EEPROM 116 stores control programs that perform operation checks and the like of each unit. Moreover, the EEPROM 116 stores firmware for causing the operation of the scanner unit 101, the printer unit 102, the FAX unit 103, the I/F (interface) 104, the panel unit 105, the HDD 106 and the like. The firmware is divided into firmware for each function in order to improve the processing speed for updating, for example. Furthermore, the respective firmware that is divided for each function has version information (described later) 116a to 116c and the like that includes a unique function name and version number, and this will be described in detail later.

The firmware-management unit 117 manages the management table 400 (described later) that indicates the combination of the latest versions of firmware that guarantees the operation of the firmware. Moreover, the firmware-management unit 117, based on an instruction from the system-control unit 121, reads the version information 116a to 116c (described later) that includes the function name and version number of the firmware for each function stored in the EEPROM 116, compares that version information 116a to 116c with the version information 400a to 400c of the management table 400, and checks whether or not the version information 116a to 116c and the version information 400a to 400c match.

The image-processing unit 118 performs image processing (rasterization) of the image data that is read by the scanner unit 101. Moreover, the image-processing unit 118 performs image processing (rasterization) of data to be printed that is registered in a user box of the HDD 106. The system-control unit 121 causes printing data that has undergone image processing by the image-processing unit 118 to be temporarily stored in the RAM 115.

The panel-operation-control unit 119 controls the display operation of the panel unit 105. Moreover, the panel-operation-control unit 119, via the panel unit 105, receives the start of printing, copying, FAX, data transmitting or receiving via a network 300 and the like. Furthermore, the panel-operation-control unit 119, based on an instruction from the system-control unit 121, causes the panel unit 105 to display check results of the firmware-management unit 117. The panel-operation-control unit 119 also via the panel unit 105 receives an instruction for latest version of the management table 400 (described later), a download instruction for firmware of an arbitrary function, and the like.

The system-control unit 121 controls cooperative operation of each of the units. Moreover, when copying or printing is selected via the panel unit 105, the system-control unit 121, via the scanner-control unit 111 or printer-control unit 112, controls reading of a document by the scanner unit 101, or printing on paper by the printer unit 102. Furthermore, when there is an instruction via the panel unit 105 to download the latest version of the management table 400 (described later), or the firmware of an arbitrary function, the system-control unit 121, via the communication-control unit 114, sends a request to the information-distribution sensor 200 for downloading the latest version of the management table 400 (described later), or the firmware of an arbitrary function. Moreover, when there is an instruction via the panel unit 105 to check versions of firmware, the system-control unit 121 instructs the firmware-management unit 117 to read the version information that includes the function name and version number of the firmware for each function that is stored in the EEPROM 116, and to compare that version information with the version information 400a to 400c of the management table 400. The system-control unit 121 instructs the panel-operation-control unit 119 to display the check results of the firmware-management unit 117.

Moreover, when the firmware-management unit 117 confirms that the version information 116a to 116c (described later) that is read from the EEPROM 116 and the version information 400a to 400c of the management table 400 (described later) match, the system-control unit 12 determines that the combination is a combination of the latest versions of firmware that guarantees operation, and instructs the panel-operation-control unit 119 to display package information 116A (described later). Furthermore, when the firmware-management unit 117 confirms that the version information 116a to 116c (described later) that is read from the EEPROM 116 and the version information 400a to 400c of the management table 400 (described later) do not match, the system-control unit 12 determines that the combination is not a combination of the latest versions of firmware that guarantees operation, and instructs the panel-operation-control unit 119 to display contents indicating that the operation is not guaranteed. When the system-control unit 121 determines that the combination is not a combination of the latest versions of firmware that guarantees operation, the system-control unit 112 may instruct the panel-operation-control unit 119 to display the version information 116a to 116c that does not match the version information 400a to 400c of the management table 400.

Next, the firmware and the like that is installed in the MFP 100 will be explained with reference to FIGS. 2A and 2B. First, FIG. 2A illustrates version information 116a to 116c of firmware before updating that is stored in the EEPROM 116. The version information 116a to 116c includes the function names and version numbers of the MFP 100.

In other words, the version information 116a indicates, for example, "Firmware A ver. 1.0". Moreover, version information 116b indicates, for example, "Firmware B ver. 2.3". Furthermore, version information 116c indicates, for example, "Firmware C ver. 3.1". Here, "Firmware A", "Firmware B" and "Firmware C" indicate the function name, and "ver. 1.0", "ver. 2.3" and "ver. 3.1" indicate the version number. Package information 116A that is "Package ver. 1.0" is also given to the version information 116a to 116c. Here, a "Package" indicates a combination of firmware, and "ver. 1.0" indicates the version number. In other words, package information 116A indicates a combination of the latest versions that guarantees operation of the firmware.

Moreover, FIG. 2B illustrates version information 116a to 116c of firmware after updating that is stored in the EEPROM 116. FIG. 2B illustrates the case in which version information 116a is upgraded to "ver. 1.1", and version information 116b is downgraded to "ver. 2.2".

In this case, the version information 116a, 116b in FIG. 2A of the firmware before updating that is stored in the EEPROM 116 is re-written to the version information 116a, 116b in FIG. 2B of firmware after updating. Here, it is presumed that in an emergency due to the occurrence of a bug in the firmware for example, the version information 116a, 116b is updated by importing firmware for upgrading and firmware for downgrading from a storage device such as a USB memory.

Figure 2C:
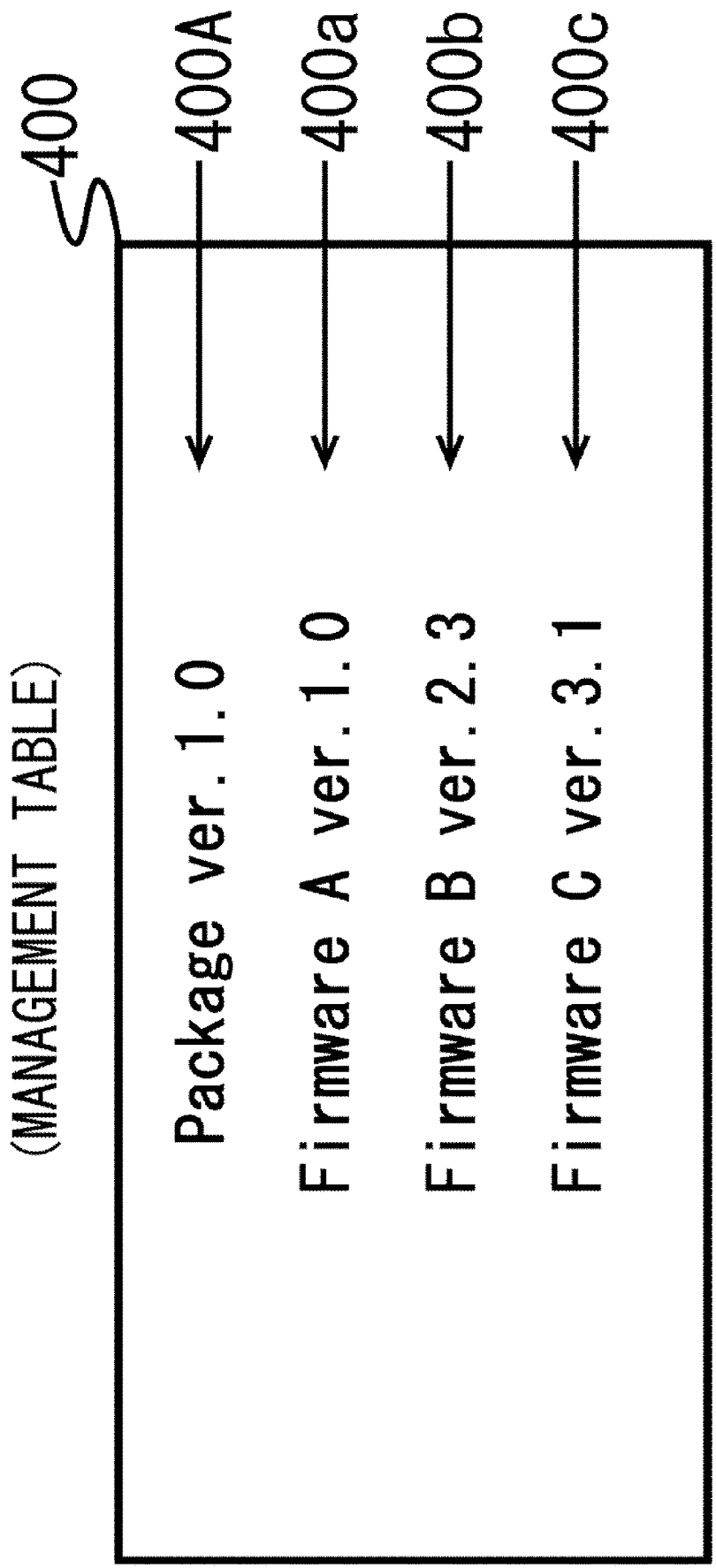
Figure 3:
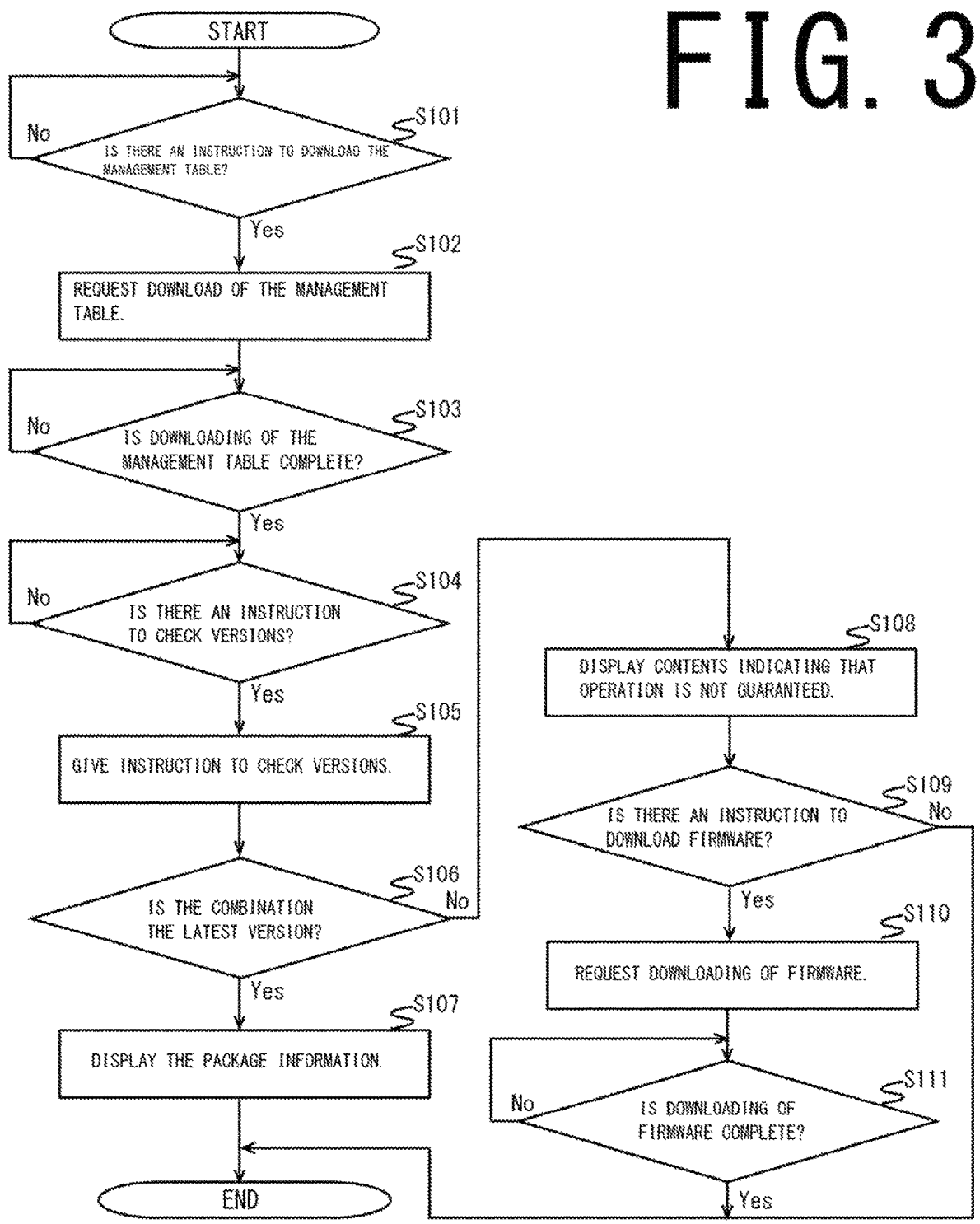
FIG. 3 illustrates steps of a firmware version checking process by the MFP in FIG. 1.
Figure 4B:
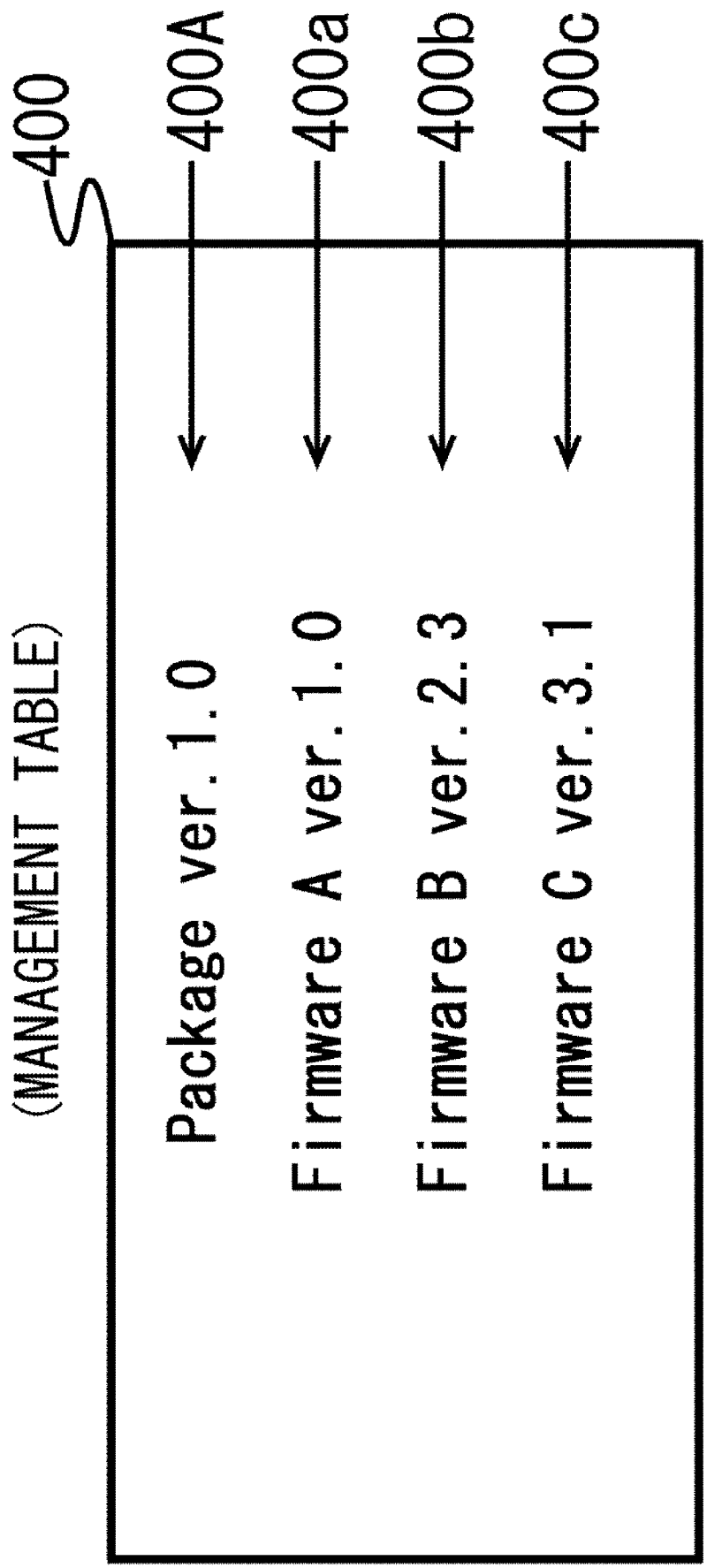

FIG. 2C illustrates a management table 400 that indicates the combination of the latest versions of firmware that guarantees operation of the firmware. In the management table 400, package information 400A and version information 400a to 400c are registered. Here, the version information 400a to 400c is managed by the package information 400A to be the combination of the latest versions of firmware that guarantees operation.

In other words, package information 400A is Package ver. 1.0, and indicates the combination of the latest versions of firmware that guarantee operation. Version information 400a indicates "Firmware A ver. 1.0". Version information 400b indicates "Firmware B ver. 2.3". Version information 400c indicates "Firmware C ver. 3.1". Moreover, "Package", as described above, indicates a combination of firmware, and "ver. 1.0" indicates the version number. Moreover, "Firmware A", "Firmware B" and "Firmware C", as described above, indicate the function name, and "ver. 1.0", "ver. 2.3" and "ver. 3.1", as described above, indicate the version number. The management table 400 in FIG. 2C is downloaded from the information-distribution server 200, and is managed by the firmware-management unit 117. The management table 400 may also be imported from a storage device such as USB memory.

Here, the firmware-management unit 117, based on a version check instruction from the system-control unit 121, reads the version information 116a to 116c that includes the function name and version number of firmware for each function that is stored in the EEPROM 116, and compares that information with the version information 400a to 400c of the management table. In this case, as in FIG. 2A when the firmware is in the state before being updated, the firmware-management unit 117 compares the version information 116a to 116c that is read from the EEPROM 116 with the version information 400a to 400c of the management table 400. At this time, the system-control unit 121 determines that the version information 116a to 116c that is read from the EEPROM 116 is a combination of the latest versions of firmware that guarantees operation, and instructs the panel-operation-control unit 119 to display the package information 116A.

However, as illustrated in FIG. 2B, when the firmware of version information 116a (Firmware A) is upgraded, and the firmware of version information 116b (Firmware B) is downgraded, for example, the firmware-management unit 117 confirms that the version information 116a, 116b of the version information 116a to 116c that is read from the EEPROM 116 and the version information 400a, 400b of the management table 400 do not match. At this time, the system-control unit 121 determines that the version information 116a to 116c that is read from the EEPROM 116 is not a combination of the latest versions of firmware that guarantees operation, and instructs the panel-operation-control unit 119 to display contents indicating that operation is not guaranteed. In this case, the system-control unit 121 may instruct the panel-operation-control unit 119 to display the version information 116a, 116b that does not match version information 400a, 400b of the management table.

Next, the process for checking the versions of firmware will be explained with reference to FIG. 3. In the following, the explanation will include the case as illustrated in FIG. 2A before updating the firmware, and the case as illustrated in FIG. 2B after updating of the firmware. Moreover, in the case as illustrated in FIG. 2B after updating of the firmware, the case will be explained in which the firmware (Firmware A) of version information 116a is upgraded, and the firmware (Firmware B) of version information 116b is downgraded.

(Step S101)

The system-control unit 121 determines whether or not there is an instruction to download the management table 400.

In this case, when there is no notification from the communication-control unit 114 that there is an instruction via the panel unit 105 to download the latest version of the management table 400, the system-control unit 121 determines that there is no instruction to download the management table 400 (step S101: NO).

However, when there is a notification from the communication-control unit 114 that there is an instruction via the panel unit 105 to download the latest version of the management table 400, the system-control unit 121 determines that there is an instruction to download the management table 400 (step S101: YES), and processing moves to step S102.

(Step S102)

The system-control unit 121 requests a download of the management table 400.

In this case, the system-control unit 121, via the communication-control unit 114, requests a download of the management table 400 to the information-distribution server 200 over the network 300.

(Step S103)

The system-control unit 121 determines whether or not downloading of the management table 400 is complete.

In this case, when there is no notification from the communication-control unit 114 that downloading of the management table is complete, the system-control unit 121 determines that the downloading of the management table 400 is not complete (step S103: NO).

However, when there is a notification from the communication-control unit 114 that downloading of the management table is complete, the system-control unit 121 determines that the downloading of the management table 400 is complete (step S103: YES), and processing moves to step S104.

(Step S104)

The system-control unit 121 determines whether or not there is an instruction to check the versions.

In this case, when there is no notification from the panel-operation-control unit 119 that an instruction is received via the panel unit 105 for checking the versions, the system-control unit 121 determines that there is no instruction for checking the versions (step S104: NO).

However, when there is a notification from the panel-operation-control unit 119 that an instruction is received via the panel unit 105 for checking the versions, the system-control unit 121 determines that there is an instruction for checking the versions (step S104: YES), and processing moves to step S105.

(Step S105)

The system-control unit 121 gives an instruction for checking versions.

In this case, the system-control unit 121 gives an instruction to the firmware-management unit 117 for checking versions.

At this time, based on the instruction from the system-control unit 121 for checking versions, the firmware-management unit 117 reads the version information 116a to 116c that includes the function name and version number of the firmware for each function that is stored in the EEPROM 116, and compares that information with the version information 400a to 400c of the management table 400.

In this case, the firmware-management unit 117 confirms that before updating of the firmware as illustrated in FIG. 2A, the version information 116a to 116c that is read from the EEPROM 116 matches the version information 400a to 400c of the management table 400.

However, when, as illustrated in FIG. 2B for example, the firmware (Firmware A) of version information 116a is upgraded and the firmware (Firmware B) of the version information 116b is downgraded, the firmware-management unit 117 confirms that the version information 116a, 116b of the version information 116a to 116c that is read from the EEPROM 116 does not match the version information 400a, 400b of the management table 400.

(Step S106)

The system-control unit 121 determines whether or not the combination is a combination of the latest versions.

When the firmware-management unit 117 confirms that the version information 116a, 116b of the version information 116a to 16c that is read from the EEPROM 116 and the version information 400a, 400b of the management table 400 do not match, the system-control unit 121 determines that the combination is not a combination of the latest versions of firmware that guarantees the operation (step S106: NO), and processing moves to step S108.

In other words, as illustrated in FIG. 2B, for example, when the firmware (Firmware A) of version information 116a is upgraded and the firmware (Firmware B) of version information 116b is downgraded, the information does not match the version information 400a, 400b of the management table 400, so the system-control unit 121 determines that the combination is not a combination of the latest versions of firmware that guarantees operation.

However, when the firmware-management unit 117 confirms that the version information 116a to 116c that is read from the EEPROM 116 and the version information 400a to 400c of the management table 400 match, the system-control unit 121 determines that the combination is a combination of the latest versions of firmware that guarantees operation (step S106: YES), and processing moves to step S107.

In other words, as illustrated in FIG. 2A, when then there is no update of firmware, the version information 116a to 116c and the version information 400a to 400c of the management table 400 matches, so the system-control unit 121 determines that the combination is a combination of the latest versions of firmware that guarantees operation.

(Step S107)

The system-control unit 121 causes the package information 116A to be displayed.

In this case, the system-control unit 121 instructs the panel-operation-control unit 119 to display the package information 116A. As a result, the package information 116A is displayed on the panel unit 105, so by checking the package information 116A that is displayed on the panel unit 105, it is possible to identify that the firmware installed in the MFP 100 is a combination of the latest versions of firmware that guarantees operation.

(Step S108)

The system-control unit 121 causes contents to be displayed indicating that the operation is not guaranteed.

In this case, the system-control unit 121 instructs the panel-operation-control unit 119 to display contents indicating that operation is not guaranteed. As a result, contents indicating that operation in not guaranteed are displayed on the panel unit 105, so by checking the contents displayed on the panel unit 105, it is possible to identify that the firmware installed in the MFP is not a combination of the latest versions that guarantee operation.

In this case, the system-control unit 121 may also instruct the panel-operation-control unit 119 to display the version information 116a, 116b that does not match the version information 400a, 400b of the management table 400. As a result, by checking the version information 116a, 116b for which operation is not guaranteed that is displayed on the panel unit 105, it is possible to easily identify the version information 116a, 116b for which operation is not guaranteed.

(Step S109)

The system-control unit 121 determines whether or not there is a download instruction for firmware (Firmware A) and/or (Firmware B).

In this case, when there is no notification from the communication-control unit 114 indicating that there is an instruction via the panel unit 105 to download firmware (Firmware A) and/or (Firmware B), the system-control unit 121 determines there is no instruction for downloading firmware (Firmware A) and/or (Firmware B) (step S109: NO), and processing ends.

In other words, in an emergency due to the occurrence of a bug or the like in the firmware (Firmware A) and/or (Firmware B), when there is no need to update the upgraded firmware (Firmware A) and/or the downgraded firmware (Firmware B), it is possible avoid updating the firmware (Firmware A) and/or (Firmware B) by not sending a download instruction.

However, when there is a notification from the communication-control unit 114 indicating that there is an instruction via the panel unit 105 to download firmware (Firmware A) and/or (Firmware B), the system-control unit 121 determines there is an instruction for downloading firmware (Firmware A) and/or (Firmware B) (step S109: YES), and processing moves to step S110.

In other words, in an emergency due to the occurrence of a bug or the like in the firmware (Firmware A) and (Firmware B) and it is necessary to update the upgraded firmware (Firmware A) and/or the downgraded firmware (Firmware B), it is possible to update the firmware (Firmware A) and/or firmware (Firmware B) by sending a download instruction.

(Step S110)

The system-control unit 121 requests a download of firmware (Firmware A) and/or (Firmware B).

In this case, the system-control unit 121, via the communication-control unit 114, sends a download request to the information-distribution server 200 for downloading firmware (Firmware A) and/for (Firmware B) over the network 300.

(Step S111)

The system-control unit 121 determines whether or not downloading of firmware (Firmware A) and/or (Firmware B) is complete.

In this case, when there is no notification from the communication-control unit 114 indicating that downloading of firmware (Firmware A) and/or (Firmware B) is complete, the system-control unit 121 determines that downloading of firmware (Firmware A) and/or (Firmware B) is not complete (step S111: NO).

However, when there is a notification from the communication-control unit 114 indicating that downloading of firmware (Firmware A) and/or (Firmware B) is complete, the system-control unit 121 determines that downloading of firmware (Firmware A) and/or (Firmware B) is complete (step S111: YES), and processing ends.

In this way, in this embodiment, a plurality of firmware having version information 116a to 116c to which package information 116A is given that indicates the combination of the latest versions of firmware that guarantees operation is stored by the EEPROM 116 (storage device), and based on an instruction to check the versions of firmware, a firmware-management unit 117 having the latest version of a management table 400 that is downloaded from an information-distribution unit 200 in which the latest versions of a plurality of firmware version information 400a to 400c and package information 400A that indicates a combination of firmware are registered checks whether or not version information 116a to 116c of the respective firmware that is read from the EEPROM (storage device) and the version information 400a to 400c of the management table 400 match, and a system-control unit 121 instructs the firmware-management unit 117 to check the versions, and causes the checked results from the firmware-management unit 117 to be displayed on the panel unit 105.

Moreover, when there is an instruction via the panel unit 105 to download the latest version of the management table, the system-control unit 121 sends a download request to the information-distribution server 200 for downloading the latest version of the management table 400, and when there is a download instruction via the panel unit 105 based on the check results from the firmware-management unit 117, the system-control unit 121 sends a download request to the information-distribution server 200 for downloading firmware.

Therefore, it is possible to select firmware for which downloading is requested via the panel unit 105, so in the case of an emergency, for example, and there is no need for updating the upgraded and/or downgraded firmware, it is possible to select only firmware other than upgraded and/or downgraded firmware, so it is possible to update only necessary firmware.

Moreover, when the firmware-management unit 117 confirms that the version information 116a to 116c of the respective firmware that is read from the EEPROM 116 (storage device) and the version information 400a to 400c that is registered in the management table 400 do no match, the system-control unit 121 determines that the combination is not a combination of the latest versions of firmware that guarantees operation, and causes the panel unit 105 to display the version information 116a to 116c that does not match the version information 400a to 400c that is registered in the management table 400, so it is possible to give the user a warning prompt that operation is not guaranteed.

Moreover, the system-control unit 121 requests download of firmware for which there is a download instruction only when there is a download instruction for firmware that is indicated by version information 116a to 116c that is displayed on the panel unit, so it is possible to avoid unintentional updating of firmware.

Furthermore, in this embodiment, it is possible to individually update each individual firmware that is stored in the EEPROM 116 (storage device), so even when updating some firmware by importing from a USB memory, for example, it can be accomplished without being affected by the version check process by the system-control unit 121.

In the software-update-support apparatus on the typical example described above, when a combination of version information of each software that is installed in a PC is not a guaranteed combination of version information, a software-update-support program on the management-server side can cause the necessary software to be downloaded and updated.

In other words, in this software-update-support apparatus, a management-server side has a guaranteed version combination table for determining whether or not a combination of version information of each software that is installed in a PC is a combination of guaranteed version information. Moreover, by an update request from the PC, software that is necessary for the combination of version information for which operation is guaranteed is identified on the management-server side and downloaded.

Incidentally, in the image-forming apparatus described above, the combination of installed firmware may be a combination of the latest versions of firmware that guarantee operation. However, in an emergency when a bug or the like occurs in firmware for an arbitrary function, for example, the firmware of the arbitrary function may be upgraded and/or downgraded. Particularly in the case of the firmware of an arbitrary function being upgraded, the release may not be in time, and when that happens, the upgrade may be performed by importing firmware for upgrading from a storage device such as a USB (Universal Serial Bus) memory or the like.

In this way, when firmware of an arbitrary function is upgraded and/or downgraded, as in the case of a software update method of a typical example, when an update request is sent to the management server side, the management server side causes the image-forming apparatus to download the necessary firmware so that the combination of version information becomes a combination that is guaranteed in the guaranteed version combination table. In this case, in an emergency, the firmware of an arbitrary function that is upgraded and/or downgraded is updated to firmware of a version that is guaranteed in the guaranteed version combination table. In other words, in an emergency for example, even when it is desired to update only firmware other than upgraded and/or downgraded firmware, there is a problem in that firmware that is guaranteed in the guaranteed version combination table on the management-server side is updated.

In the case of the electronic machine, version check system and recording medium according to the present disclosure, a storage device stores a plurality of firmware that is divided according to each function and that has version information to which package information is given that indicates a combination of the latest versions of firmware that guarantees operation, and a firmware-management unit that has a latest version of a management data that is downloaded from an information-distribution server in which version information of the latest versions of a plurality of firmware and package information that indicates a combination of firmware are registered, based on an instruction to check the version of firmware, checks whether or not the version information of respective firmware that is read from the storage device and version information that is registered in the management table match, and a system-control unit instructs the firmware-management unit to perform a version check, and causes the check results from the firmware-management unit to be displayed on a panel unit.

Moreover, when there is an instruction via the panel unit to download the latest version of the management table, the system-control unit sends a request to the information-distribution server for downloading the latest version of the management table, and when there is an instruction via the panel unit for a download based on the check results from the firmware-management unit, the system-control unit sends a request to the information-distribution sever for downloading firmware.

Therefore, it is possible to select via the panel unit firmware for which downloading is requested, so when there is no need to update upgraded and or downgraded firmware in an emergency, for example, it is possible to update only firmware other than the upgraded and/or downgraded firmware.

According to the present disclosure, it is possible to select via the panel unit firmware for which downloading is requested, so it is possible to update only necessary firmware.

In the following, a second embodiment of an electronic machine according to the present disclosure will be explained while referencing FIG. 1, and FIG. 4A to FIG. 6. In this embodiment, as will be described in detail later, when arbitrary firmware is updated to a custom version of firmware, the MFP 100 illustrated in FIG. 1 generates a management table 401 that will be described later. Moreover, the MFP 100 registers the generated management table 401 in an information-providing server 200.

Moreover, when there is arbitrary firmware that is updated to a custom version of firmware based on an instruction from the system-control unit 121, the firmware-management unit 117 generates a management table 401 that will be described later.

The panel-operation-control unit 119 receives an instruction via the panel unit 105 to download the latest version of the management table 400 (described later), the management table 401 (described later) that is registered in the information-providing server 200, and firmware for an arbitrary function, and the like.

Moreover, when there is an instruction via the panel unit 105 to download the latest version of the management table 400 (described later), the management table 401 (described later) that is registered in the information-providing server 200, and firmware for an arbitrary function, the system-control unit 121, via the communication-control unit 114, sends a download request to the information-providing server 200 for downloading the latest version of the management table 400 (described later), the management table 401 (described later) that is registered in the information-providing server 200, and firmware for an arbitrary function. Furthermore, when arbitrary firmware is updated to a custom version of firmware, the system-control unit 121 sends a request to the firmware-management unit 117 to generate the management table 401 (described later).

The system-control unit 121 also registers the management table 401 that is generated by the firmware-management unit 117 in the information-providing server 200. In this case, the system-control unit 121 attaches machine-unique information to the management table 401 such as the MAC address and the like of the MFP 100, and registers the management table 401 in the information-providing server 200. Moreover, when the management table 401 is generated by the firmware-management unit 117 as arbitrary firmware is updated to a custom version of firmware, the system-control unit 121 instructs the firmware-management unit 117 to check whether or not the version information 116a, 116B, 116c (described later) that is read from the EEPROM 116 and the version information 400a, 400B, 400c of the management table 401 (described later) match.

As in the first embodiment, the version information 116a to 116c of firmware before updating and the like (refer to FIG. 5A), and the management table 400 (refer to FIG. 5B) that indicates the combination of the latest versions of firmware that guarantees operation of the firmware are stored in the EEPROM 116 of the MFP 100.

Next, referring to FIGS. 5A and 5B, the case in which arbitrary firmware that is installed in the MFP 100 is updated to a custom version of firmware will be explained. First, FIG. 5A illustrates version information 116a, 116B, 116c of firmware that is stored in the EEPROM 116 and that is the target of update. The version information 116a, 116B 116c, as described above, includes the function names and version numbers of the MFP 100.

In other words, FIG. 5A illustrates the case in which firmware (Firmware B) having version information 116b that indicates "Firmware B ver. 2.3", for example is updated to a custom version of firmware (Firmware B') having version information 116B that indicates "Firmware B' ver. 23 custom", for example. The custom version of firmware (Firmware B') is firmware that is customized according to apparatus specifications, and, for example, is firmware that is imported from a storage device such as a USB (Universal Serial Bus) memory.

In this way, when firmware (Firmware B) is updated to a custom version of firmware (Firmware B'), the firmware-management unit 117, based on an instruction from the system-control unit 121 to check the versions, compares the version information 116a, 116B, 116c and the version information 400a to 400c of the management table 400 illustrated in FIG. 6B, and confirms there is no match. In this case, version information 116B and version information 400b do not match, so, by the system-control unit 121 downloading firmware (Firmware B) that corresponds to the version information 400b from the information-providing server 200, the custom version of firmware (Firmware B') is updated to firmware (Firmware B).

Therefore, in this embodiment, the system-control unit 121 causes the firmware-management unit 117 to generate the management table 401 illustrated in FIG. 5B to correspond to the case in which firmware (Firmware B) is updated to a custom version of firmware (Firmware B'). The management table 401 replaces the version information 400b of the firmware (Firmware B) that is the object of update with version information 400B of the custom version of firmware (Firmware B'). In this case, the firmware-management unit 117 replaces the management table 400 in FIG. 6A with the management table 401 in FIG. 5B. The management table 400 in FIG. 6A may be deleted or may be stored in the HDD 106.

Here, the package information 400A of the management table 401 illustrated in FIG. 5B, the same as described above, is Package ver. 1.0. Moreover, the package information 400a, the same as described above, indicates "Firmware A ver. 1.0", and the package information 400c, the same as described above, indicates "Firmware C ver. 3.1". However, version information 400B is firmware that corresponds to the custom version of firmware (Firmware B'), and indicates "Firmware B' ver. 2.3 custom".

In this way, even when the version information 116b is updated to version information 116B, the firmware-management unit 117, by comparing the version information 116a, 116B, 116c in FIG. 5A and the version information 400a, 400B, 400c in the management table 401 in FIG. 5B, confirms a match. In this case, even when there is an instruction via the panel unit 105 for a version check, the version information 116B and the version information 400B match, so the system-control unit 121 does not execute a download from the information-providing server 200, so the custom version of version information 116B is not updated to version information 116b.

Moreover, the system-control unit 121 registers the management table 401 that is generated by the firmware-management unit 117 in the information-providing server 200. In this case, machine-unique information such as the MAC address of the MFP 100 and the like is attached to the management table 401. On the information-providing server 200 side the management table 401 that is associated with the machine-unique information is managed. Moreover, on the information-providing server 200 side, when there are changes in respective versions of firmware (Firmware A), firmware (Firmware B) and firmware (Firmware C), a change in the version of the custom version of firmware (Firmware B') that is registered in the management table 401 is not performed. As a result, on the MFP 100 side, when the management table 401 that is registered in the information-providing server 200 is downloaded, it is possible to check whether or not the versions of firmware (Firmware A) and firmware (Firmware C) are the latest versions.

Figure 6:
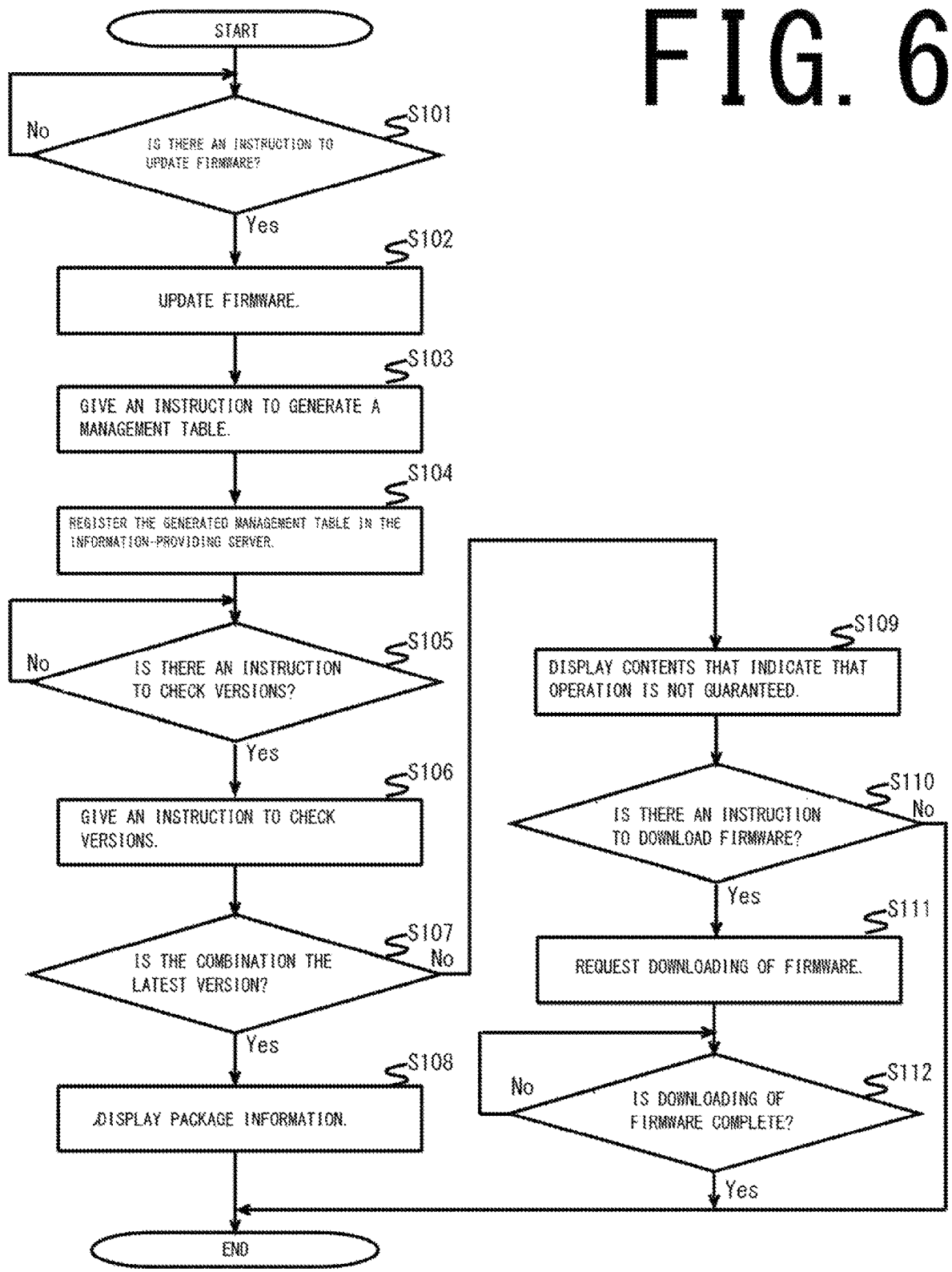
FIG. 6 illustrates steps of a firmware version checking process by the MFP in FIG. 1.

Next, the process for checking the versions of firmware will be explained with reference to FIG. 6. In the following, as illustrated in FIG. 5A, the case is explained in which a custom version of firmware (Firmware B') is read from a USB memory for example, and firmware (Firmware B) that is already installed is up dated.

(Step S201)

The system-control unit 121 determines whether or not there is an instruction to update firmware.

In this case, when there is no notification from the panel-operation-control unit 119 indicating that there is an instruction via the panel unit 105 to update firmware, the system-control unit 121 determines that there is no instruction to update firmware (step S201: NO).

However, when there is a notification from the panel-operation-control unit 119 indicating that there is an instruction via the panel unit 105 to update firmware, the system-control unit 121 determines that there is an instruction to update firmware (step S201: YES), and processing moves to step S202.

(Step S202)

The system-control unit 121 updates the firmware.

In this case, the system-control unit 121 reads a custom version of firmware (Firmware B') from a USB memory, and updates the firmware (Firmware B) that is stored in the EEPROM 116 to the firmware (Firmware B').

(Step S203)

The system-control unit 121 gives an instruction to generate a management table 401.

In this case, the system-control unit 121 gives an instruction to the firmware-management unit 117 to generate a management-table 401. When doing this, the firmware-management unit 117 reads version information 116a, 116B, 116c from the EEPROM 116, and generates a management table 401 as illustrated in FIG. 5B.

In other words, as described above, this management table 401 is a table in which the version information 400b of the firmware (Firmware B) that is to be updated is replaced with version information 400B of the custom version firmware (Firmware B').

As mentioned above, the management table 400 may be deleted or may be stored in the HDD 106.

(Step S204)

The system-control unit 121 registers the generated management table 401 in the information-providing server 200.

In this case, the system-control unit 121 registers the management table 401 that is generated by the firmware-management unit 117 in the information-providing server 200. Moreover, when registering the management table 401 in the information-providing server 200, the system-control unit 121 attaches machine-unique information such as the MAC address of the MFP 100 and the like.

As a result, when there is a request from the MFP 100 for downloading the management table 401, the information-providing server 200 is able to transmit the management table 401 that corresponds to the machine-unique information to the MFP 100.

(Step S205)

The system-control unit 121 determines whether or not there is a version check instruction.

In this case, where there is no notification from the panel-operation-control unit 119 indicating that a virtual check instruction via the panel unit 105 is received, the system-control unit 121 determines there is no version check instruction (step S205: NO).

However, where there is a notification from the panel-operation-control unit 119 indicating that a version check instruction via the panel unit 105 is received, the system-control unit 121 determines there is a version check instruction (step S205: YES), and processing moves to step S206.

(Step S206)

The system-control unit 121 gives a version check instruction.

In this case, the system-control unit 121 sends a version check instruction to the firmware-management unit 117.

At this time, the firmware-management unit 117 reads version information 116a, 116B, 116c that is stored in the EEPROM 116 and includes the function name and version number of firmware for each function, and compares that version information with the version information 400a, 400B, 400c of the management table 401.

In this case, when the firmware-management unit 117 confirms that the version information 116a, 116B, 116c that is read from the EEPROM 116 and the version information 400a, 400B, 400c of the management table 401 match, the firmware-management unit 117 notifies the system-control unit 121 that there is a match.

In other words, by referencing the management table 401 that is generated by the firmware-management unit 117, it is possible to confirm that the version information 116a, 116B, 116c and the version information 400a, 400B, 400c of the management table 401 match even when there is a version check instruction via the panel unit 105.

When there is an emergency due to the occurrence of a bug or the like and firmware (Firmware A) having version information 116a, for example is upgraded to a custom version of firmware (Firmware A ver. 1.0) that has different version information than version information 116a, or in other words, when firmware having version information 116a is old version Firmware A ver. 0.9, the firmware-management unit 119 notifies the system-control unit 121 that there is no match.

(Step S207)

The system-control unit 121 determines whether or not the combination is a combination of the latest versions.

In this case, when a notification is received from the firmware-management unit 117 that there is a match, the system-control unit 121 determines that the combination is a combination of the latest versions (step S207: YES), and processing moves to step S208.

However, when a notification is received from the firmware-management unit 117 that there is no match, the system-control unit 121 determines that the combination is not a combination of the latest versions (step S207: NO), and processing moves to step S209.

(Step S208)

The system-control unit 121 causes the package information 116A to be displayed.

In this case, when a notification is received from the firmware-management unit 117 that there is a match, the system-control unit 121 sends an instruction to the paneloperation-control unit 119 to display the package information 116A. As a result, the package information 116A is displayed on the panel unit 105, so by confirming that the package information 116A is displayed on the panel unit 105, it is possible to confirm that the firmware installed in the MFP 100 is a combination of the latest versions that guarantees operation.

(Step S209)

The system-control unit 121 causes contents indicating that operation is not guaranteed to be displayed.

In this case, the system-control unit 121 sends an instruction to the panel-operation-control unit 119 to display contents indicating that operation is not guaranteed. In other words, as described above, for example, when firmware (Firmware A ver. 0.9) having version information 116a is upgraded to firmware (Firmware A ver. 1.0) having version information that differs from version information 116a, the system-control unit 121 sends an instruction to the panel-operation-control unit 119 to display as a combination of firmware, contents indicating that operation is not guaranteed.

In this case, the system-control unit 121 may send an instruction to the panel-operation-control unit 119 to display version information of the firmware (Firmware A ver. 0.9) that does not match the version information 400a of the management table 401. In doing so, by checking the version information that is displayed on the panel unit 105 for which operation is not guaranteed, it is possible to easily identify the firmware (Firmware A ver. 0.9) for which operation is not guaranteed as the combination of firmware.

(Step S210)

The system-control unit 121 determines whether or not there is an instruction to download firmware.

In this case, when there is no notification from the panel-operation unit 119 indicating an instruction to upgrade firmware (Firmware A ver. 0.9) via the panel unit 105, or in other words, an instruction to download firmware (Firmware A ver. 1.0), the system-control unit 121 determines there is no instruction to download firmware (step S210: NO).

However, when there is a notification from the panel-operation unit 119 indicating an instruction to upgrade firmware (Firmware A ver. 0.9) via the panel unit 105, or in other words, an instruction to download firmware (Firmware A ver. 1.0), the system-control unit 121 determines there is an instruction to download firmware (step S210: YES), and processing moves to step S211.

(Step S211)

The system-control unit 121 requests a download of firmware.

In this case, the system-control unit 121, via the communication-control unit 114, sends a request to the information-providing server 200 on the network 300 for downloading firmware (Firmware A ver. 1.0).

(Step S215)

The system-control unit 121 determines whether or not downloading of firmware is complete.

In this case, when there is no notification from the communication-control unit 114 indicating that downloading of firmware (Firmware A ver. 1.0) is complete, the system-control unit 121 determines downloading of firmware (Firmware A ver. 1.0) is not complete (step S215: NO).

However, when there is a notification from the communication-control unit 114 indicating that downloading of firmware (Firmware A ver. 1.0) is complete, the system-control unit 121 determines downloading of firmware (Firmware A ver. 1.0) is complete (step S215: YES), and processing ends.

In this way, in this embodiment, an EEPROM 116 (storage device) stores a plurality of firmware divided for each function having version information 116a to 116c to which package information 116A is given that indicates a combination of the latest versions of firmware that guarantees operation, and a firmware-management unit 117 in which version information 400a to 400c and package information 400A of firmware is registered, and that has the latest version of a management table 400 (first management table) that is downloaded from an information-providing server 200, and based on an instruction to check the version of firmware, checks whether or not version information 116a to 116c of respective firmware that is read from the EEPROM 116 (storage device) and version information 400a to 400c that is registered in the management table 400 (first management table) match.

Moreover, when the firmware-management unit confirms that there is no match, the system-control unit downloads firmware from the information-providing server that corresponds to the non-matching version information that is registered in the first management table, and updates the firmware that is registered in the storage device to the downloaded firmware.

Furthermore, when firmware, for example firmware (Firmware B), that is stored in the EEPROM 116 (storage device) is updated to a custom version of firmware (Firmware B'), the system-control unit 121 instructs the firmware-management unit 117 to generate a management table 401 (second management table) in which the version information 400b of the firmware (Firmware B) to be updated is replaced with version information 400B of the custom version of firmware (Firmware B').

Moreover, when there is an instruction to check the versions of firmware, the system-control unit 121 causes the firmware-management unit 117 to check whether or not the version information 116a, 116B, 116c of respective firmware that is read from the EEPROM 116 (storage device) and the version information 400a, 400B, 400c that is registered in the management table 401 (second management table) match.

Here, the management table 401 (second management table) is a management table in which the version information 400b for the firmware (Firmware B) that is to be updated is replaced with version information 400B of a custom version of firmware (Firmware B'), so the firmware-management unit 117 compares the version information 116a, 116B, 116c of the respective firmware that is read from the EEPROM 116 (storage device) and the version information 400a, 400B, 400c that is registered in the management table 401 (second management table), and confirms a match. As a result, it is possible to prevent the custom version of firmware (Firmware B') from being updated to the latest version of firmware (Firmware B) that is managed by the management table 400 (first management table).

Moreover, when trying a custom version of firmware and the MFP 100 downloads a management table 400 from the information-providing server 200 of which the package information is updated (for example, updated to version information of firmware (Firmware A ver. 1.1) that is not a custom version of which the version information of firmware (Firmware A ver. 1.0) is upgraded), the firmware-management unit 117, by an instruction from the system-control unit 121, may rewrite the version information of firmware excluding the custom version of firmware of the management table 401 to version information of a newly downloaded management table 400. In this case, in step S211 illustrated in FIG. 6, when an instruction to download is received via the panel unit 105, the system-control unit 121, via the communication-control unit 114, may send a request to the information-providing server 200 on the network 300 for downloading upgraded firmware (Firmware A ver. 1.1).

Incidentally, in a typical image-forming apparatus described above, as firmware that can be installed there is a genuine version the operation of which is guaranteed by the provider of the firmware, a custom version that is customized according to specifications of the apparatus, and an evaluation version that is provided for evaluation by actually using the version in development stage having a limited trial period. Here, in an image-forming apparatus, a custom version of firmware that is customized according to the specifications of the apparatus, for example, may be installed. In that case, existing firmware is replaced by a custom version of firmware. In the case of a custom version of firmware, the custom version of firmware is imported from a storage device such as a USB (Universal Serial Bus) memory, and the existing firmware is replaced with the custom version of firmware.

When firmware of an arbitrary function is replaced with a custom version of firmware in this way, as in a typical example of a software update method, when an update request is sent to the management-server side, the necessary firmware is downloaded to the image-forming apparatus so that the combination of version information becomes a combination that is guaranteed in a guaranteed version information combination table. In this case, there is a problem in that the custom version of firmware that replaces the existing firmware is updated to a version of firmware that is guaranteed by the guaranteed version combination table.

In the electronic machine and recording medium according to the present disclosure, a storage device stores a plurality of firmware divided according to each function having version information to which package information is given that indicates a combination of the latest versions of firmware that guarantees operation, and a firmware-management unit that has the latest version of a first management table that is downloaded from an information-providing server and in which version information and package information of firmware are registered, and based on an instruction to check the version of firmware, checks whether or not version information of respective firmware that is read from the storage device and version information that is registered in the first management table match.

Moreover, when the firmware-management unit confirms that there is no match, the system-control unit downloads firmware that corresponds to the non-matching version information that is registered in the first management table from the information-providing server, and updates the firmware that is registered in the storage device to the downloaded firmware.

Furthermore, when updating the firmware that is stored in the storage device to a custom version of firmware, the system-control unit instructs the firmware-management unit to generate a second management table in which the version information of firmware to be updated is replaced with version information of a custom version of firmware.

Moreover, when there is an instruction to check the versions of firmware, the system-control unit causes the firmware-management unit to check whether or not the version information of the respective firmware that is read from the storage device and version information that is registered in the second management table match.

Here, the second management table is a table for replacing version information of firmware that is to be updated to version information of a custom version of firmware, so when comparing the version information of respective firmware that is read from the storage device and the version information that is registered in the second management table, the firmware-management unit confirms a match. As a result, the custom version of firmware is not updated to the latest version of firmware that is managed in the first management table.

According to the present disclosure, a second management table is generated in which version information of firmware to be updated is replaced with version information of a custom version of firmware, so it is possible to prevent the custom version of firmware from being updated to the latest version of firmware that is managed by the first management table.

In the following, a third embodiment of an electronic machine according to the present disclosure will be explained with reference to FIG. 1 and FIG. 7A to FIG. 9. In this embodiment, the MFP 100 illustrated in FIG. 1, as will be described in detail later, generates a management table 401 (described later) when arbitrary firmware is updated to an evaluation version of firmware. Moreover, when the trial period for the evaluation version of firmware is passed, the MFP 100 returns the management table 401 to the management table 400 that indicates the combination of the latest versions of firmware.

Moreover, the firmware-management unit 117 generates a management table 401 (described later) when arbitrary firmware is updated to an evaluation version of firmware based on an instruction from the system-control unit 121.

Furthermore, when arbitrary firmware is updated to an evaluation version of firmware, the system-control unit 121 instructs the firmware-management unit 117 to generate a management table 401 (described later).

Moreover, when the management table 401 is generated by the firmware-management unit 117 as arbitrary firmware is updated to an evaluation version of firmware, the system-control unit 121 instructs the firmware-management unit 117 to check whether or not version information 116*a*, 116B, 116*c* (described later) that is read from the EEPROM 116 and the version information 400*a*, 400B, 400*c* of the management table 401 (described later) match.

Figure 7B:
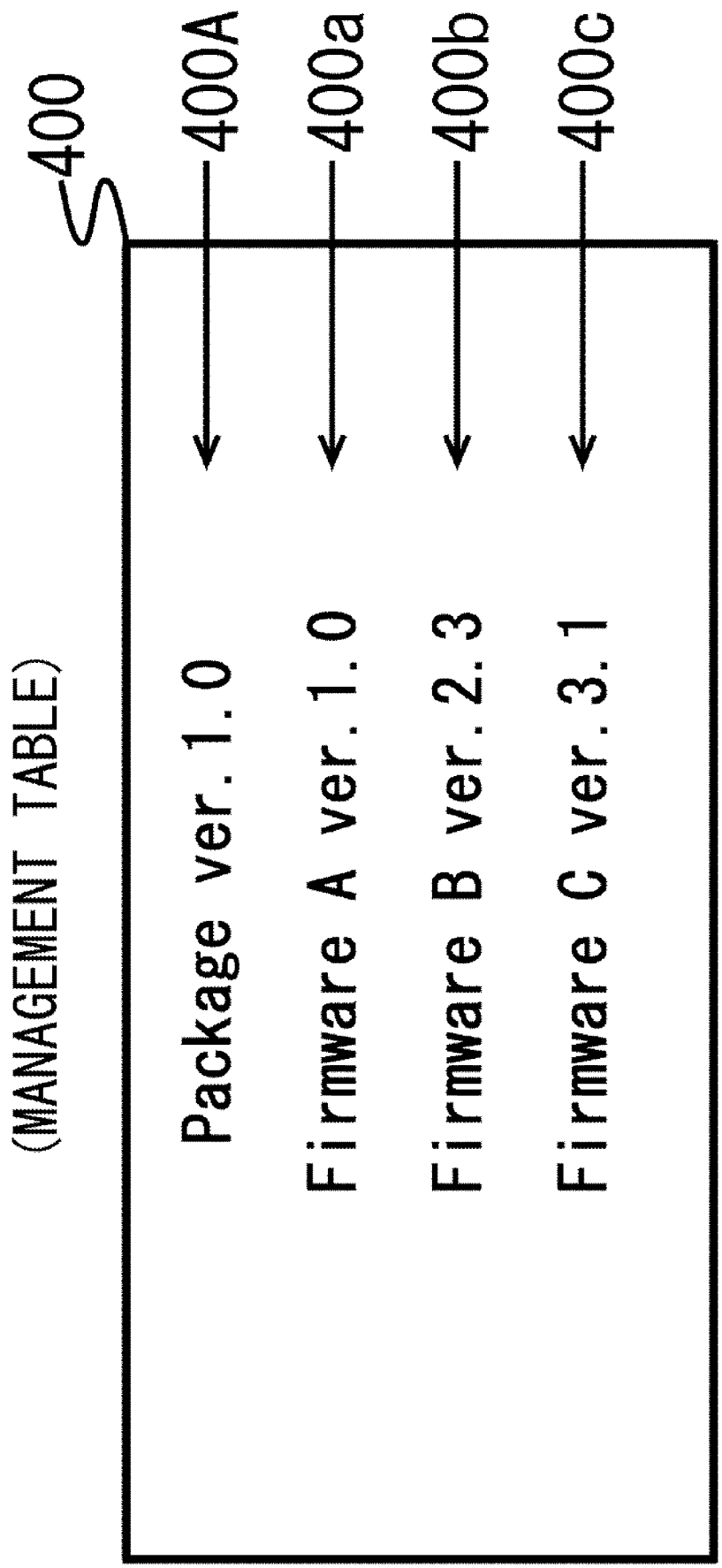

As in the first embodiment, the EEPROM 116 of the MFP 100 stores version information 116*a* to 116*c* and the like of firmware before updating (refer to FIG. 7A), and a management table 400 that indicates a combination of the latest versions of firmware that guarantees operation of the firmware (refer to FIG. 7B).

Figure 8A:
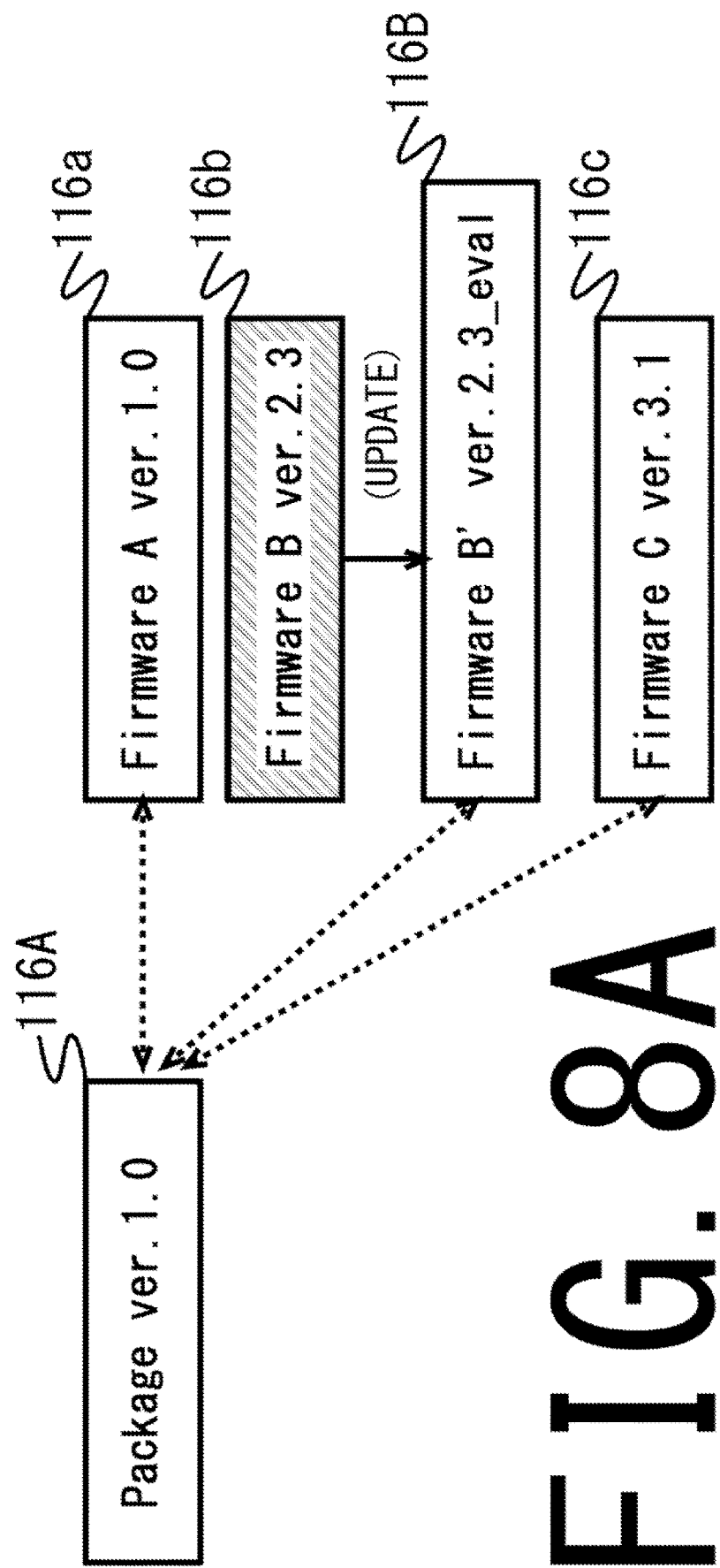

Next, the case in which arbitrary firmware that is installed in the MFP 100 is updated to an evaluation version of firmware will be explained with reference to FIGS. 8A and 8B. First, FIG. 8A illustrates version information 116*a*, 116B, 116*c* of firmware that is stored in the EEPROM 116 and that is to be updated. The version information 116*a*, 116B, 116*c*, as described above, includes function names and version numbers of the MFP 100.

In other words, FIG. 8A illustrates a case in which firmware (Firmware B) having version information that indicates "Firmware B ver. 2.3" in FIG. 7A for example is updated to an evaluation version of firmware (Firmware B') having version information 116B that indicates "Firmware B' ver. 2.3_eval (evaluation version)" for example. The evaluation version of firmware (Firmware B') is presumed to be updated by importing from a storage device such as a USB (Universal Serial Bus) memory or the like.

When the firmware (Firmware B) is updated to an evaluation version of firmware (Firmware B') in this way, and the firmware-management unit 117, based on an instruction to check the versions from the system-control unit 121 compares the version information 116a, 116B, 116c and the version information 400a to 400c of the management table 400 in FIG. 7B, confirms there is no match. In this case, version information 116B and version information 400b do not match, so by the system-control unit 121 downloading firmware that corresponds to version information 400b from the information-providing server 200, the evaluation version of firmware (Firmware B') is updated to firmware (Firmware B).

Figure 8B:
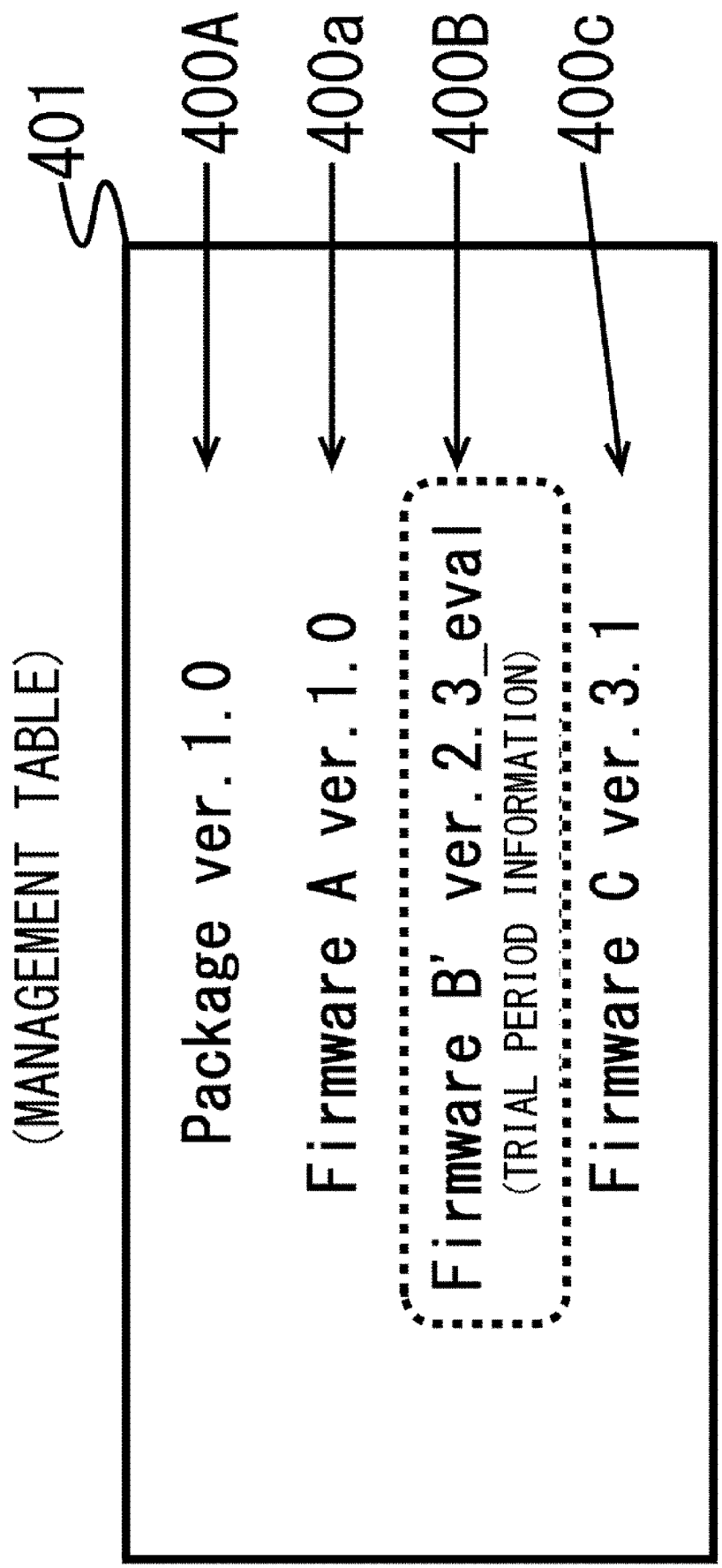

Therefore, in this embodiment, the system-control unit 121 causes the firmware-management unit 117 to generate the management table 401 that is illustrated in FIG. 8B to correspond with the case in which the firmware (Firmware B) is updated to an evaluation version of firmware (Firmware B'). The management table 401 is a management table in which the version information 400b of the firmware (Firmware B) to be updated is replaced with version information 400B of the evaluation version of firmware (Firmware B'). In this case, the firmware-management unit 117 replaces the management table 400 in FIG. 7A with the management table 401 in FIG. 8B. The management table 400 in FIG. 7A may then be deleted or may be stored in the HDD 106. When the management table 400 is deleted, by downloading the management table 400 from the information-providing server 200 after the trial period of the evaluation version of firmware (Firmware B') has passed, a version check by the firmware-management unit 117 can be performed. On the other hand, when the management table 400 is stored in the HDD 106, by reading the management table 400 from the HDD 106 after the trial period of the evaluation version of firmware (Firmware B') has passed, a version check by the firmware-management unit 117 can be performed.

Here, the package information 400A of the management table 401 illustrated in FIG. 8B, the same as described above, is Package ver. 1.0. Moreover, the version information 400a, the same as described above, indicates "Firmware A ver. 1.0", and version information 400c, the same as described above, indicates "Firmware C ver. 3.1". However, version information 400B is version information that corresponds to an evaluation version of firmware (Firmware B'), and indicates "Firmware B' ver. 2.3 eval". Moreover, trial-period information that indicates the trial period of the evaluation version is included in the version information 400B. The trial-period information has contents that indicate a period, for example 30 days after installation, during which the firmware may be tried.

In this way, even when the version information 116b is updated to version information 116B, the firmware-management unit 117, by comparing the version information 116a, 116B, 116c in FIG. 8A with the version information 400a, 400B, 400c of the management table 401 in FIG. 8B, confirms that there is a match. In this case, even when there is an instruction via the panel unit 105 to check the version, by the version information 116B and the version information 400B matching, the system-control unit 121 does not execute downloading from the information-providing server 200, so the evaluation version of version information 116B is not updated to the version information 116b.

The system-control unit 121 references the trial-period information that is included in the version information 400B of the management table 401, and when the trial period is passed, instructs the firmware-management unit 117 to return the management table 401 in FIG. 8B to the management table 400 in FIG. 7B. In this case, when the management table 400 has been deleted, the system-control unit 121 downloads the management table 400 from the information-providing server 200, and gives the management table 400 to the firmware-management unit 117. On the other hand, when the management table 400 is stored in the HDD 106, the system-control unit 121 reads the management table 400 from the HDD 106 and gives the management table to the firmware-management unit 117.

Then, the system-control unit 121 sends an instruction to the firmware-management unit 117 to check the versions. In this case, the firmware-management unit 117 confirms that the version information 116a, 116B, 16c that is read from the EEPROM 16 and the version information 400a, 400b, 300c of the management table 400 in FIG. 7B do not match. Moreover, the system-control unit 121 confirms that the version information 116B and the version information 400b do not match, downloads firmware (Firmware B) that matches version information 400b from the information-providing server 200, and updates the evaluation version of firmware (Firmware B') to firmware (Firmware B).

Next, the process for checking the versions of firmware will be explained with reference to FIG. 9. In the following, a case as illustrated in FIG. 8A will be explained in which an evaluation version of firmware (Firmware B') is imported from a USB memory for example, and firmware (Firmware B) that is already installed is updated.

(Step S301)
The system-control unit 121 determines whether or not there is an instruction to update firmware.

In this case, when there is no notification from the panel-operation-control unit 119 indicating that there is an instruction via the panel unit 105 to update firmware, the system-control unit 121 determines there is no instruction to update firmware (step S301: NO).

However, when there is a notification from the panel-operation-control unit 119 indicating that there is an instruction via the panel unit 105 to update firmware, the system-control unit 121 determines there is an instruction to update firmware (step S301: YES), and processing moves to step S302.

(Step S302)
The system-control unit 121 updates the firmware.

In this case, the system-control unit 121 imports an evaluation version of firmware (Firmware B') from a USB memory, and updates the firmware (Firmware B) that is stored in the EEPROM 116 with the firmware (Firmware B').

(Step S303)
The system-control unit 121 gives an instruction to generate a management table 401.

In this case, the system-control unit 121 confirms that trial-period information is included in the version information of the firmware (Firmware B') and instructs the firmware-management unit 117 to generate a management table 401. At this time, the firmware-management unit 117 reads version information 116a, 116B, 116c from the EEPROM 116 and generates the management table 401 illustrated in FIG. 8B.

In other words, as described above, this management table 401 is a management table in which the version information 400b of the firmware (Firmware B) to be updated is replaced with version information 400B of the evaluation version of firmware (Firmware B').

As was described above, the management table 400 may be deleted, or may be stored in the HDD 106.

Here, version information 400a, 400B, 400c that corresponds to version information 116a, 116B, 116c is registered in the management table 401 in FIG. 8B. Moreover, trial-period information that indicates the trial period of the evaluation version is registered in the version information 400B that corresponds to the evaluation version of version information 116B. The trial-period information, as described above, has contents that indicate a period, for example 30 days after installation, during which the firmware may be tried.

(Step S304)

The system-control unit 121 determines whether or not the trial period has passed.

In this case, the system-control unit 121 references the trial-period information that is included in the version information 400B of the management table 401, and when the date is within the trial period, determines that the trial period has not passed (step S304: NO), and processing moves to step S305.

However, when the system-control unit 121 references the trial-period information that is included in the version information 400B of the management table 401 and the date is outside of the trial period, the system-control unit 121 determines that the trial period has passed (step S304: YES), and processing moves to step S308.

In this case, the system-control unit 121 may count a signal from a timer for example, and determine whether the count is within the trial period or outside the trial period. Moreover, the firmware-management unit 117 that manages the management table 401 may count a signal from a timer for example, and determine whether the count is within the trial period or outside the trial period, then notify the system-control unit 121.

(Step S305)

The system-control unit 121 determines whether or not there is an instruction to check the versions.

In this case, when there is no notification from the panel-operation-control unit 119 that an instruction is received via the panel unit 105 to check the versions, the system-control unit 121 determines that there is no instruction to check the versions (Step S305: NO).

However, when there is a notification from the panel-operation-control unit 119 that an instruction is received via the panel unit 105 to check the versions, the system-control unit 121 determines that there is an instruction to check the versions (Step S305: YES), and processing moves to step S306.

(Step S306)

The system-control unit 121 gives an instruction to check the versions.

In this case, the system-control unit 121 instructs the firmware-management unit 117 to check the versions.

At this time, the firmware-management unit 117 reads version information 116a, 116B, 116c that is stored in the EEPROM 116 and that includes the function names and version numbers of firmware for each function, and compares that version information with the version information 400a, 400B, 400c of the management table 401.

In this case, when the firmware-management unit 117 confirms that the version information 116a, 116B, 116c that is read from the EEPROM 116 and the version information 400a, 400B, 400c of the management table 401 match, the firmware-management unit 117 notifies the system-control unit 121 that there is a match.

In other words, by referencing the management table 401 that is generated by the firmware-management unit 117, even when there is an instruction via the panel unit 105 to check the version within the trial period of the evaluation version of firmware, it is possible to confirm that the version information 116a, 116B, 116c and the version information 400a, 400B, 400c of the management table 401 match.

In an emergency due to the occurrence of a bug or the like and firmware (Firmware A ver. 0.9) that has version information 116a for example is upgraded to firmware (Firmware A ver. 1.0) that is not an evaluation version that has version information that is different than version information 116a, or in other words, when the firmware having version information 116a is old version Firmware A ver. 0.9, the firmware-management unit 117 notifies the system-control unit 121 that there is no match.

(Step S307)

The system-control unit 121 causes package information 116A to be displayed, and processing returns to step S304.

In this case, when a notification is received from the firmware-management unit 117 indicating that there is a match, the system-control unit 121 instructs the panel-operation-control unit 119 to display package information 116A. As a result, package information 116A is displayed on the panel unit 105, so by checking the package information 116A that is displayed on the panel unit 105, even though the evaluation version of firmware (Firmware B') is installed, it is possible to confirm that the firmware that is installed in the MFP 100 is a combination of the latest versions that guarantees operation.

When a notification is received from the firmware-management unit 117 indicating that there is no match, the system-control unit 121 causes contents to be displayed on the panel unit 105 that indicate that operation is not guaranteed, and may prompt the user to decide whether or not to download firmware (Firmware A ver. 1.1) after the upgrade described above for example. Here, when an instruction is received via the panel unit 105 to download firmware, the system-control unit 121 may send a request via the communication-control unit 114 to the information-providing server 200 on the network 300 to download the upgraded firmware (Firmware A ver. 1.0).

(Step S308)

The system-control unit 121 gives an instruction to return to the management table 400 before the update.

In this case, when the trial period of the evaluation version of firmware (Firmware B') is passed, the system-control unit 121 instructs the firmware-management unit 117 to return to the management table 400 before the up date.

As described above, when the management table 400 has been deleted, the system-control unit 121 downloads the management table 400 from the information-providing server 200 and gives the management table 400 to the firmware-management unit 117. On the other hand, when the management table 400 is stored in the HDD 106, the system-control unit 121 reads the management table 400 from the HDD 106 and gives the management table 400 to the firmware-management unit 117.

Moreover, the system-control unit 121 deletes the generated management table 401 as the evaluation version of firmware (Firmware B') is updated.

(Step S309)

The system-control unit 121 determines whether or not there is an instruction to check the versions.

In this case, when there is no notification from the panel-operation-control unit 119 indicating that an instruction is received via the panel unit 105 to check the versions, the system-control unit 121 determines that there is no instruction to check the versions (step S309: NO).

However, when there is a notification from the panel-operation-control unit 119 indicating that an instruction is received via the panel unit 105 to check the versions, the system-control unit 121 determines that there is an instruction to check the versions (step S309: YES), and processing moves to step S310.
(Step S310)

The system-control unit 121 gives an instruction to check the versions.

In this case, the system-control unit 121 instructs the firmware-management unit 117 to check the versions.

At this time, the firmware-management unit 117 reads the version information 116*a*, 116B, 116*c* that is stored in the EEPROM 116, and compares that version information with the version information 400*a*, 400*b*, 400*c* of the management table 400.

In this case, the firmware-management unit 117 confirms that the version information 116B that is read from the EEPROM 116 does not match the version information 400*b* of the management table 400, and notifies the system-control unit 121.
(Step S311)

The system-control unit 121 causes contents indicating that operation is not guaranteed to be displayed.

In this case, when a notification is received from the firmware-management unit 117 that there is no match, the system-control unit 121 instructs the panel-operation-control unit 119 to display contents indicating that operation is not guaranteed. As a result, contents indicating that operation is not guaranteed are displayed on the panel unit 105, so by checking the display contents of the panel unit 105, it is possible to confirm that the evaluation version of firmware (Firmware B') that is installed in the MFP 100 is not in a combination of the latest versions that guarantees operation.

In this case, the system-control unit 121 may instruct the panel-operation-control unit 119 to display the version information 116B that does not match the version information 400*b* of the management table 400. As a result, by confirming the version information 116B that is displayed on the panel unit 105 and for which operation is not guaranteed, it is possible to easily identify version information 116B for which operation is not guaranteed.
(Step S312)

The system-control unit 121 requests downloading of firmware.

In this case, the system-control unit 121, via the communication-control unit 114, sends a request to the information-providing server 200 on the network 300 for downloading firmware (Firmware B).

The download request by the system-control unit 121 here is executed even though there is no download request from the panel unit 105.
(Step S313)

The system-control unit 121 determines whether or not downloading of firmware is complete.

In this case, when there is no notification from the communication-control unit 114 indicating that downloading of firmware (Firmware B) is complete, the system-control unit 121 determines that downloading of firmware (Firmware B) is not complete (step S313: NO).

However, when there is a notification from the communication-control unit 114 indicating that downloading of firmware (Firmware B) is complete, the system-control unit 121 determines that downloading of firmware (Firmware B) is complete (step S313: YES), and processing ends.

In this way, in this embodiment, the EEPROM 116 (storage device) stores a plurality of firmware that is divided for each function, and that has version information 116*a* to 116*c* to which package information 116A is given that indicates a combination of the latest versions of firmware that guarantees operation, and a firmware-management unit 117 that has the latest version of a management table 400 (first management table) that is downloaded from an information-providing server 200 and in which version information 400*a* to 400*c* and package information 400A of firmware are registered, and based on an instruction to check the versions of firmware, checks whether or not version information 116*a* to 116*c* of respective firmware that is read from the EEPROM 116 (storage device) and version information 400*a* to 400*c* that is registered in the management table 400 (first management table) match.

When the firmware-management unit confirms that there is no match, the system-control unit downloads firmware that corresponds to the non-matching version information that is registered in the first management table from the information-providing server, and updates the firmware that is stored in the storage device with the downloaded firmware.

Moreover, when firmware (Firmware B) that is stored in the EEPROM 116 is updated to an evaluation version of firmware (Firmware B'), the system-control unit 121 instructs the firmware-management unit 117 to generate a management table 401 (second management table) in which the version information 400*b* of the firmware (Firmware B) that is to be updated is replaced with version information 400B of the evaluation version of firmware (Firmware B').

Furthermore, when there is an instruction to check the versions of firmware, the system-control unit 121 causes the firmware-management unit 117 to check whether or not the version information 116*a*, 116B, 116*c* of the respective firmware that is read from the EEPROM 116 (storage device) and the version information 400*a*, 400B, 400*c* that is registered in the management table 401 (second management table) match.

Here, the management table 401 is a management table in which the version information 400*b* of the firmware (Firmware B) that is to be updated is replaced with the version information 400B of the evaluation version of firmware (Firmware B'), so when comparing the version information 116*a*, 116B, 116*c* of the respective firmware that is read from the EEPROM 116 (storage device) and the version information 400*a*, 400B, 400*c* that is registered in the management table 401 (second management table), the firmware-management unit confirms there is a match. As a result, the evaluation version of firmware (Firmware B') is not updated to the latest version of firmware (Firmware B) that is managed by the management table 400 (first management table), so not being able to try the evaluation version of firmware (Firmware B') can be prevented.

Figure 9:
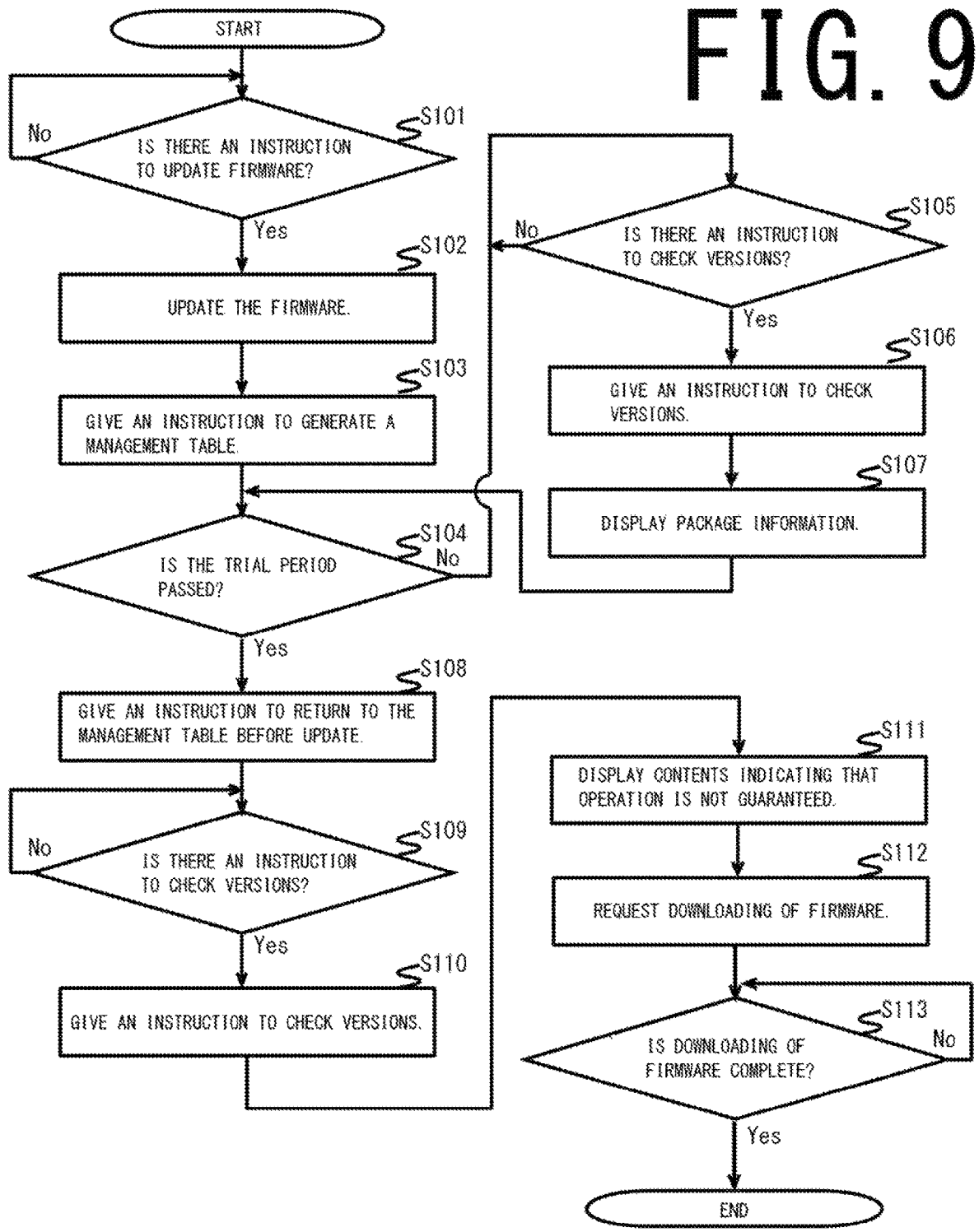
FIG. 9 illustrates steps of a firmware version checking process by the MFP in FIG. 1.

When an evaluation version of firmware is already downloaded at that start of the processing illustrated in FIG. 9, then in step S303, the system-control unit 121 may confirm that a trial-period information is included in the version information of the evaluation version of firmware that is newly imported from the USB memory and instruct the firmware-management unit 117 to correct the management table 401. At that time, the firmware-management unit 117 may read the version information of the evaluation version of firmware that is newly imported from the EEPROM 116 and rewrite the version information before update of the management table 401.

Moreover, when the MFP 100 downloads a management table 400 in which package information is updated (for example, the version information of firmware (Firmware A ver. 1.0) is updated to version information of firmware (Firmware A ver. 1.1) that is not an upgraded evaluation version) from the information-providing server 200 while trying an evaluation version of firmware, the firmware-management unit 117 may, according to an instruction from the system-control unit 121, rewrite the version information of the firmware of the management table 401 except for the evaluation version of firmware to the version information of the newly downloaded management table 400. In this case, in step S306 illustrated in FIG. 9, the firmware-management unit 117 may notify the system-control unit 121 that the version information of the firmware (Firmware A ver. 1.0) that is stored in the EEPROM 116 and the respective version information of the rewritten management table 401 do not match. When an instruction is received via the panel unit 105 to download, the system-control unit 121, via the communication-control unit 114, may send a request to the information-providing server 200 on the network 300 for downloading the upgraded firmware (Firmware A ver. 1.1).

Incidentally, in the typical image-forming apparatus described above, as firmware that can be installed, there is a genuine version the operation of which is guaranteed by the provider of the firmware, a custom version that is customized according to specifications of the apparatus, and an evaluation version that is provided for evaluation by actually using the version in development stage having a limited trial period. Here, in an image-forming apparatus, an evaluation version of firmware for evaluation, for example, may be installed. In that case, existing firmware is replaced by an evaluation version of firmware. In the case that the evaluation version of firmware is not released in time, the evaluation version of firmware may imported from a storage device such as a USB (Universal Serial Bus) memory, and the existing firmware is replaced with the evaluation version of firmware.

In this way, when firmware of an arbitrary function is replaced with an evaluation version of firmware, as in a typical example of a software update method, when an update request is sent to a management server, the management-server side uses a guaranteed version combination table and causes the image-forming apparatus to download the necessary firmware so that the combination of version information becomes a guaranteed combination. In this case, the evaluation version of firmware that replaced the existing firmware is updated to a version of firmware that is guaranteed in the guaranteed version combination table. In this way, when the evaluation version of firmware is updated to firmware that is guaranteed in the guaranteed version combination table on the management-server side, there is a problem in that it becomes impossible to try the evaluation version of firmware.

In the electronic machine and recording medium according to the present disclosure, the storage device stores a plurality of firmware that is divided for each function, and that has version information to which package information is given that indicates a combination of the latest versions of firmware that guarantees operation, and a firmware-management unit that has the latest version of a first management table that is downloaded from an information-providing server and in which version information and package information of firmware is registered, and based on an instruction to check versions of firmware, checks whether or not version information of the respective firmware that is read from the storage device and version information that is registered in the first management table match.

Moreover, when the firmware-management unit confirms that there is no match, the system-control unit downloads firmware that corresponds to the non-matching version information that is registered in the first management table from the information-providing server, and updates the firmware that is stored in the storage device to the downloaded firmware.

Furthermore, when the firmware that is stored in the storage device is updated to an evaluation version of firmware, the system-control unit instructs the firmware-management unit to generate a second management table in which version information of firmware to be update is replaced with the version information of the evaluation version of firmware.

Moreover, when there is an instruction to check the versions of firmware, the system-control unit causes the firmware-management unit to check whether or not the version information of the respective firmware that is read from the storage device and the version information that is registered in the second management table match.

Here, the second management table is a management table in which version information of firmware to be updated is replaced with version information of an evaluation version of firmware, so when comparing the version information of the respective firmware that is read from the storage device and the version information that is registered in the second management table, the firmware-management unit confirms that there is a match. As a result, the evaluation version of firmware is not updated to the latest version of firmware that is managed by the first management table.

According to the technology of the present disclosure, a second management table is generated in which version information of firmware that is to be updated is replaced with version information of an evaluation version of firmware, so it is possible to prevent not being able to try the evaluation firmware.

In the embodiments above, the MFP 100 is explained as including a panel unit 105, however, the MFP 100 is not limited to this example, and the panel unit 105 may be provided in a management apparatus that is capable of communication with the MFP 100 via a network or the like. In that case, the processing via the panel unit 105 that is explained in this embodiment is executed by the management apparatus communicating with the MFP via the panel unit 105 of the management unit. Here, the management apparatus may be a portable terminal that has a touch panel as the panel unit 105, or may be a personal computer that has a panel unit 105 of which the display and operation unit are separate.

Moreover, in the embodiments described above, the case of applying the electronic machine to a MFP 100 is explained, however, the electronic machine is not limited to this example and may be applied to other electronic machines such as a PC (Personal Computer), a portable terminal, a tablet terminal and the like that has a plurality of functions.

Furthermore, instead of an EEPROM 116, another storage device such as a non-volatile semiconductor storage device, HDD or the like may be used as the storage device.

What is claimed is:

1. An electronic machine comprising:
   a panel unit;
   a storage device that stores a plurality of firmware that is divided for each function, and that has version information to which package information is given that indicates a combination of latest versions of firmware that guarantees operation;
   a firmware-management unit that has a version of a management table in which version information of the plurality of firmware, and package information that indicates a combination of the plurality of firmware are registered, and that is downloaded from an information-distribution server, and that based on an instruction to check versions of the plurality of firmware, checks whether or not version information of respective firmware of the plurality of firmware and version information that is registered in the management table match following reading of the respective firmware from the storage device; and a system-control unit that instructs the firmware-management unit to check the versions and causes the check results of the firmware-management unit to be displayed on the panel unit; wherein when there is an instruction via the panel unit to download the version of the management table, the system-control unit sends a request to the information-distribution server for downloading the version of the management table, and when there is an instruction via the panel unit to perform a download based on the check results of the firmware-management unit, sends a request to the information-distribution server for a download; wherein the management table includes a first management table and a second management table, and the first management table is a latest version of a management table in which version information of a plurality of latest versions of firmware, and package information that indicates a combination of the plurality of firmware are registered; and the system-control unit when the firmware-management unit confirms there is no match, downloads firmware that corresponds to the non-matching version information from the information-providing server that is registered in the first management table and updates the firmware that is confirmed to not match and is stored in the storage device with the downloaded firmware; and when the firmware that is confirmed to not match and is stored in the storage device is updated to a specific version of firmware, instructs the firmware-management unit to generate the second management table as a table in which the version information of the firmware to be updated is replaced with version information of the specific version of firmware; and when there is an instruction to check the versions of the plurality of firmware, instructs the firmware-management unit to check whether or not the version information of the respective firmware that is read from the storage device and the version information that is registered in the second management table match.

2. The electronic machine according to claim 1, wherein when the firmware-management unit confirms that the version information of the respective firmware that is read from the storage device and the version information that is registered in the management table that comprises the first management table and the second management table do not match, the system-control unit determines that the combination of firmware is not a combination of the latest versions of firmware that guarantees operation, and causes the version information that does not match the version information registered in the management table to be displayed, and when there is an instruction to download the firmware that is indicated by the version information that is displayed on the panel unit, requests a download of the firmware for which there is a download instruction.

3. The electronic machine according to claim 1, wherein the specific version is a custom version.

4. The electronic machine according to claim 3, wherein the system-control unit registers the second management table that is generated by the firmware-management unit in the information-distribution server.

5. The electronic machine according to claim 1, wherein the specific version is an evaluation version.

6. The electronic machine according to claim 5, wherein the version information of the evaluation version of firmware has trial-period information that indicates a period during which the evaluation version of firmware can be tried; and when there is an instruction to check the versions of the plurality of firmware, the system-control unit references the trial-period information, and when the trial period is passed, the system-control unit instructs the firmware-management unit to check whether or not the version information of the respective firmware that is read from the storage device and the version information that is registered in the first management table match.

7. A version check system, comprising:
an electronic machine; and
a management apparatus that is capable of communicating with the electronic machine; wherein
the management apparatus has a panel unit; and
the electronic machine comprises:
a storage device that stores a plurality of firmware that is divided for each function, and that has version information to which package information is given that indicates a combination of latest versions of firmware that guarantees operation;

a firmware-management unit that has a version of a management table in which version information of the plurality of firmware, and package information that indicates a combination of the plurality of firmware are registered, and that is downloaded from an information-distribution server, and that based on an instruction to check versions of the plurality of firmware, checks whether or not version information of respective firmware of the plurality of firmware and version information that is registered in the management table match following reading of the respective firmware from the storage device; and a system-control unit that instructs the firmware-management unit to check the versions and causes the check results of the firmware-management unit to be displayed on the panel unit; wherein when there is an instruction via the panel unit to download the version of the management table, the system-control unit sends a request to the information-distribution server for downloading the version of the management table, and when there is an instruction via the panel unit to perform a download based on the check results of the firmware-management unit, sends a request to the information-distribution server for a download;

the management table includes a first management table and a second management table, the first management table is a latest version of a management table in which version information of a plurality of latest versions of firmware, and package information that indicates a combination of the plurality of firmware are registered; and the system-control unit
when the firmware-management unit confirms there is no match,
downloads firmware that corresponds to the non-matching version information from the information-providing server that is registered in the first management table and updates the firmware that is confirmed to not match and is stored in the storage device with the downloaded firmware; and
when the firmware that is confirmed to not match and is stored in the storage device is updated to a specific version of firmware,
instructs the firmware-management unit to generate the second management table as a table in which the version information of the firmware to be updated is replaced with version information of the specific version of firmware; and
when there is an instruction to check the versions of the plurality of firmware,
instructs the firmware-management unit to check whether or not the version information of the respective firmware that is read from the storage device and the version information that is registered in the second management table match.

8. A non-transitory computer-readable recording medium for storing a control program that is executable by a computer, wherein the control program causes the computer:
by a storage device, to store a plurality of firmware that is divided for each function, and that has version information to which package information is given that indicates a combination of latest versions of firmware that guarantees operation;
by a firmware-management unit that has a version of a management table in which version information of the plurality of firmware, and package information that indicates a combination of the plurality of firmware are registered, and that is downloaded from an information-distribution server, and based on an instruction to check versions of the plurality of firmware, to check whether or not version information of respective firmware of the plurality of firmware and version information that is registered in the management table match following reading of the respective firmware from the storage device; and
by a system-control unit to instruct the firmware-management unit to check the versions and cause the check results of the firmware-management unit to be displayed on the panel unit; and when there is a an instruction via the panel unit to download the version of the management table, to send a request to the information-distribution server for downloading the version of the management table, and when there is an instruction via the panel unit to perform a download based on the check results of the firmware-management unit, send a request to the information-distribution server for a download: wherein
the management table includes a first management table and a second management table,
the first management table is a latest version of a management table in which version information of a plurality of latest versions of firmware, and package information that indicates a combination of the plurality of firmware are registered; and
by the system-control unit,
when the firmware-management unit confirms there is no match,
downloads firmware that corresponds to the non-matching version information from the information-providing server that is registered in the first management table and updates the firmware that is confirmed to not match and is stored in the storage device with the downloaded firmware; and
when the firmware that is confirmed to not match and is stored in the storage device is updated to a specific version of firmware,
instructs the firmware-management unit to generate the second management table as a table in which the version information of the firmware to be updated is replaced with version information of the specific version of firmware; and
when there is an instruction to check the versions of the plurality of firmware,
instructs the firmware-management unit to check whether or not the version information of the respective firmware that is read from the storage device and the version information that is registered in the second management table match.

9. The non-transitory computer-readable recording medium according to claim 8, wherein
the specific version is a custom version.

10. The non-transitory computer-readable recording medium according to claim 8, wherein
the specific version is an evaluation version.

* * * * *